United States Patent [19]

Loveland

[11] 4,108,059

[45] Aug. 22, 1978

[54] METHOD AND MEANS FOR PEELING PINEAPPLES

[75] Inventor: Malcolm W. Loveland, Orinda, Calif.

[73] Assignee: Atlas Pacific Engineering Company, Emeryville, Calif.

[21] Appl. No.: 697,779

[22] Filed: Jun. 21, 1976

[51] Int. Cl.² ........................... A23N 4/20; A23N 7/00
[52] U.S. Cl. ....................................... 99/543; 99/546; 99/591; 99/593; 99/594
[58] Field of Search .................................. 99/537–542, 99/544, 547, 588, 591, 593, 594, 546, 543; 426/482, 484

[56] References Cited

U.S. PATENT DOCUMENTS

| | | | |
|---|---|---|---|
| 3,382,900 | 5/1968 | DeBack | 99/546 |
| 3,638,696 | 2/1972 | Loveland | 99/593 |
| 3,656,527 | 4/1972 | Vadas | 99/542 |
| 3,656,629 | 4/1972 | Vadas | 99/543 |
| 3,780,641 | 12/1973 | Hole | 426/482 |
| 3,874,280 | 4/1975 | Vadas | 99/544 |

Primary Examiner—Harvey C. Hornsby
Assistant Examiner—Robert Pous
Attorney, Agent, or Firm—Robert M. Eckhoff

[57] ABSTRACT

A method and machine for processing pineapples by sequentially drilling a central hole, cutting off the upper end, transferring the pineapple to a peelng spindle, indexing the pineapple on the spindle through a series of peeling stations, cutting off the bottom end, rotating the spindle a single turn at each peeling station adjacent an array of rotating cutters to remove spaced bands from the outer surface of the pineapple while maintaining the original ovoid shape of the pineapple, pushing the peeled pineapple through a rotating circular knife to form the pineapple into a cylinder and an outer blanket, and removing the remaining fibrous core prior to discharge. The outer blanket, frequently termed the "crush blanket", is useful as such rather than as merely a source of juice.

39 Claims, 59 Drawing Figures

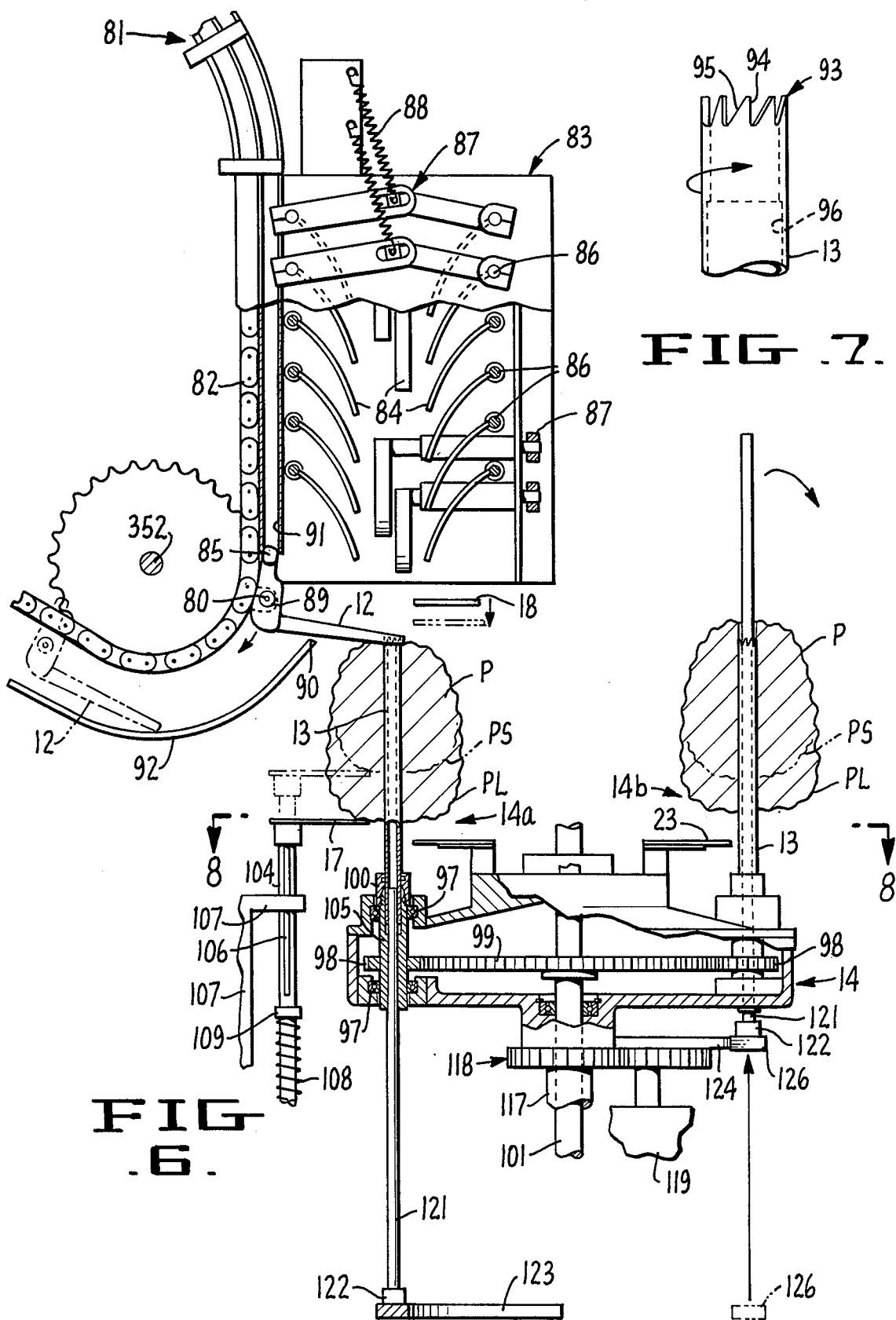

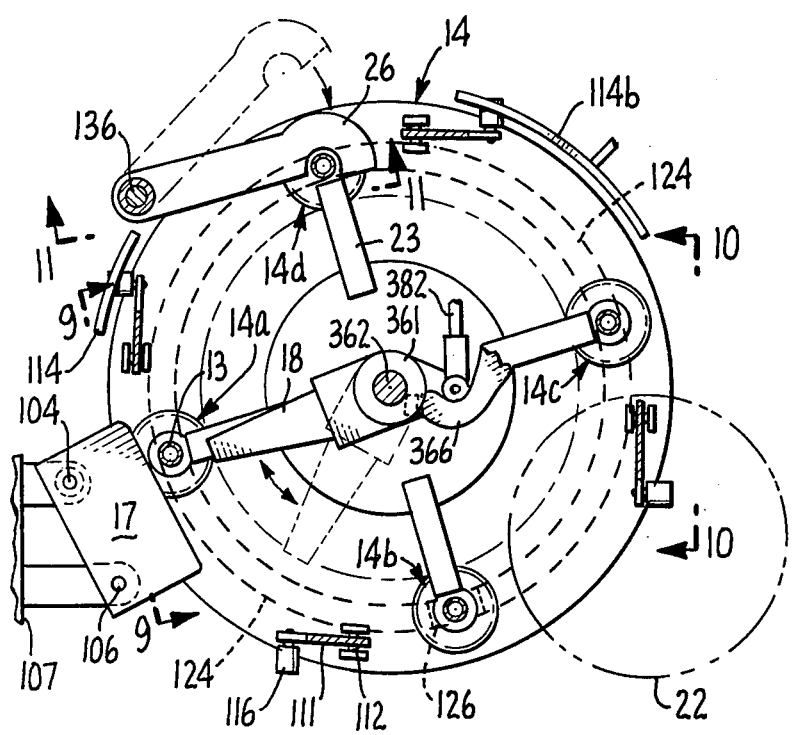
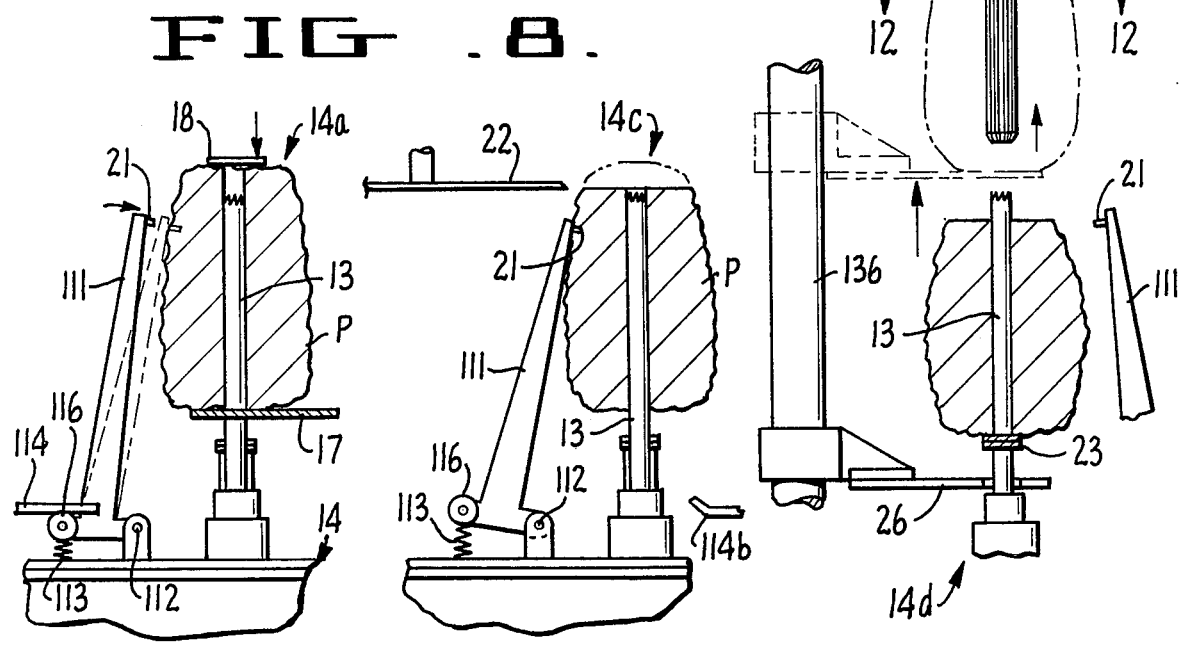

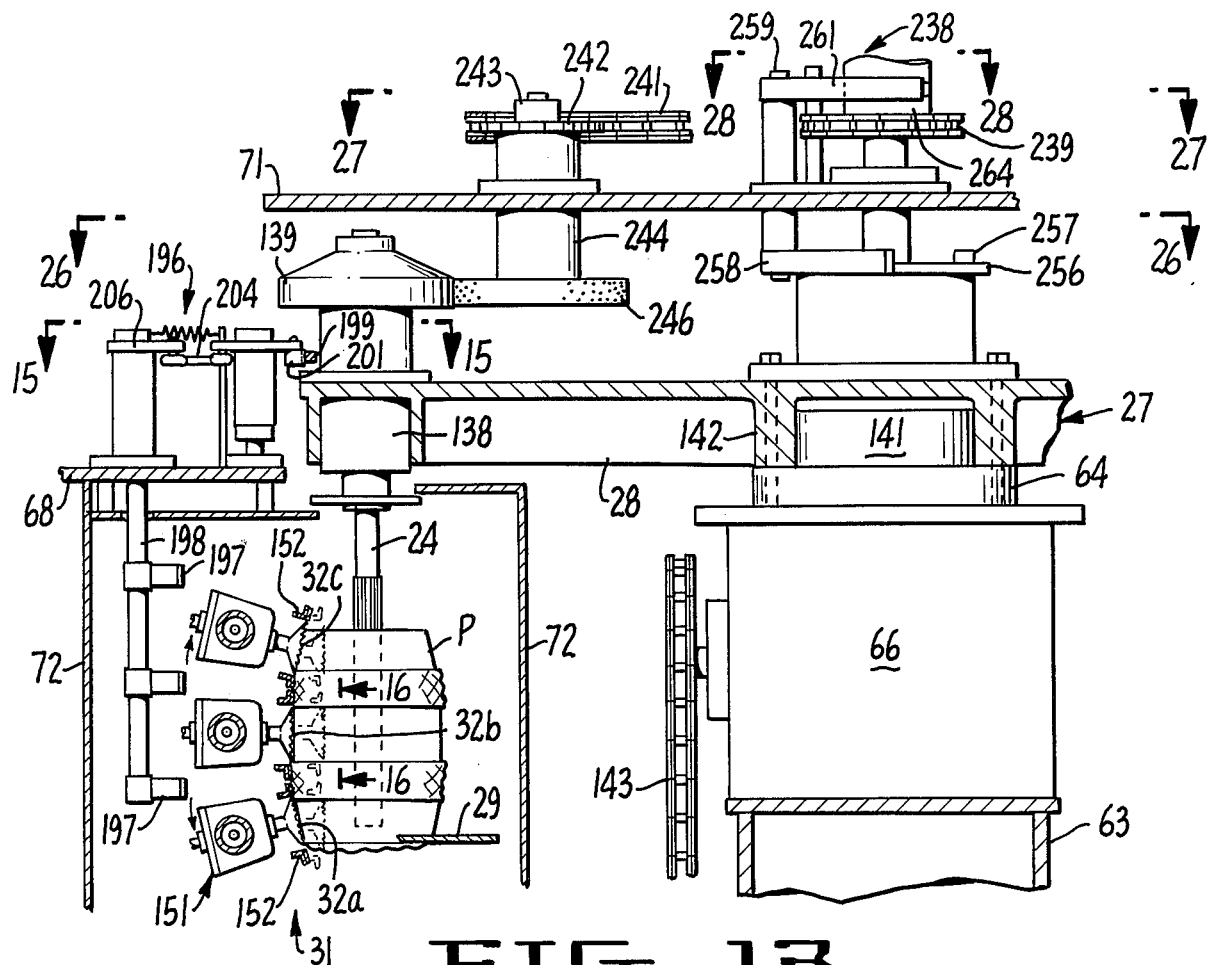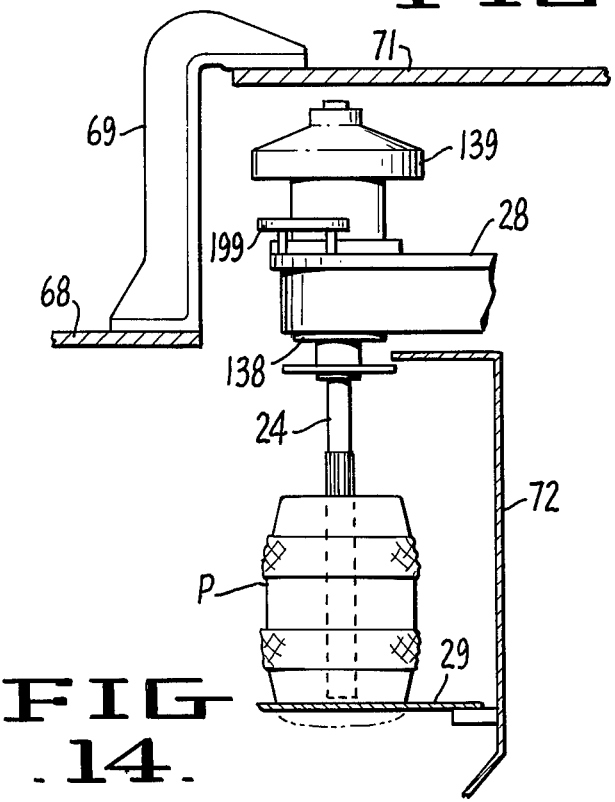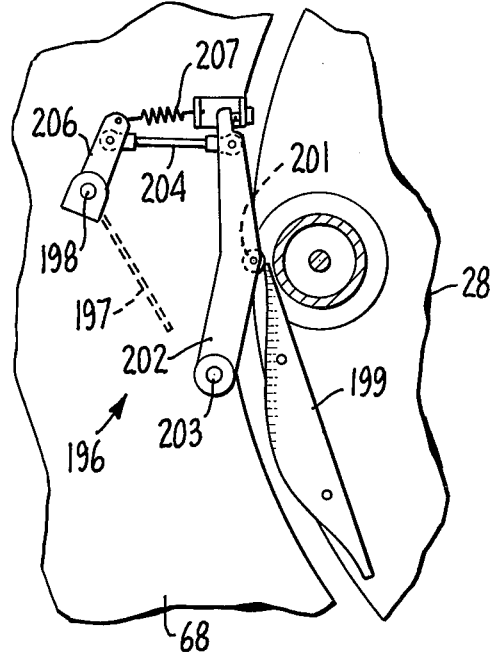

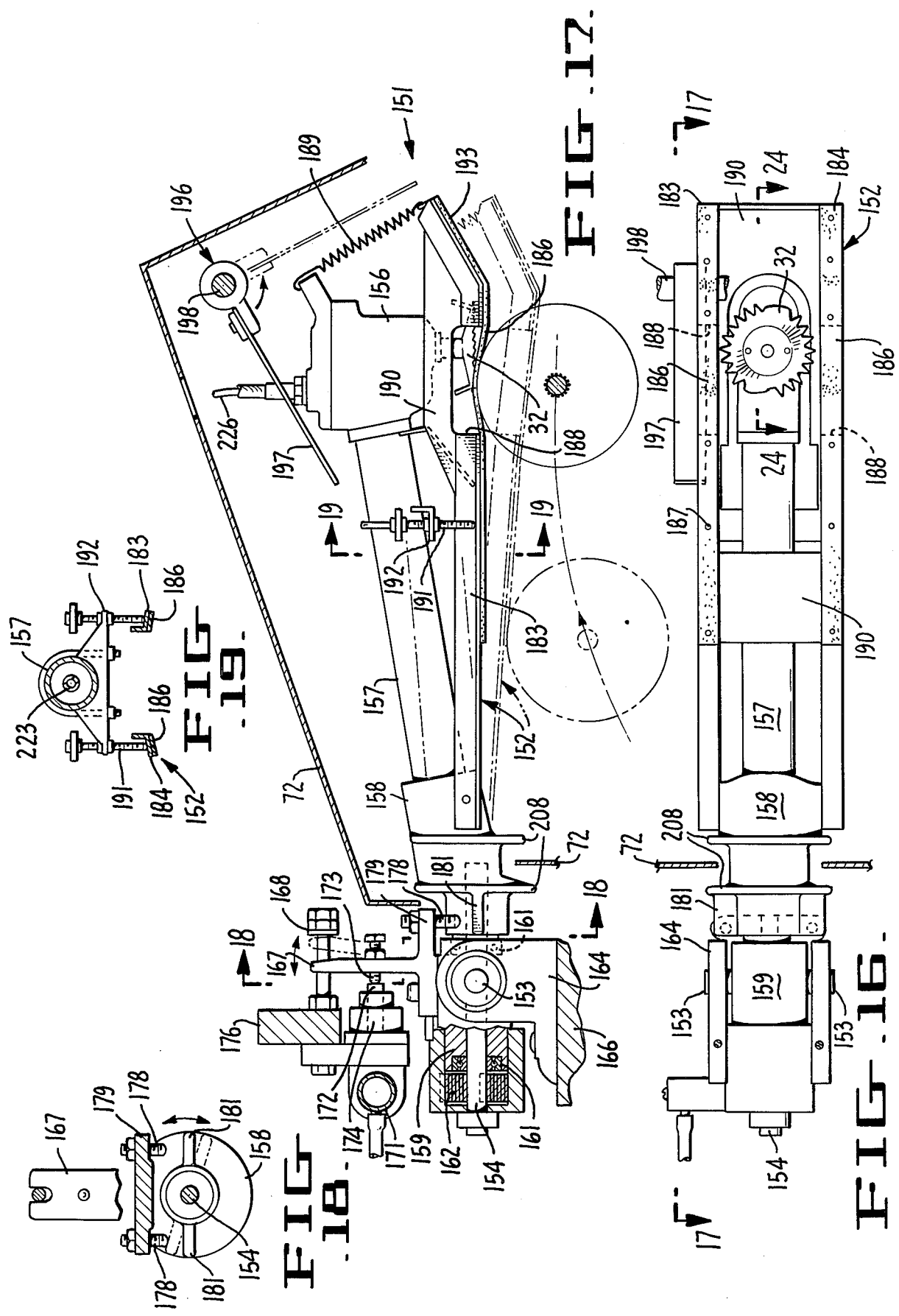

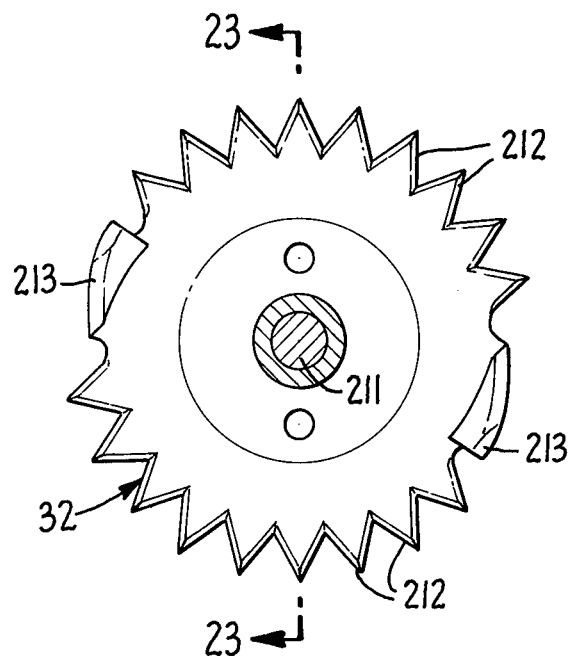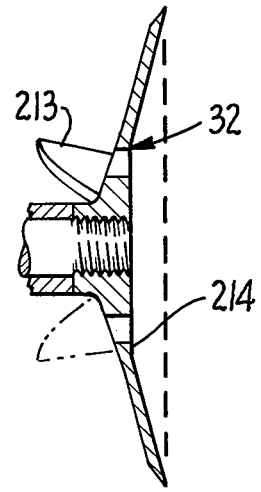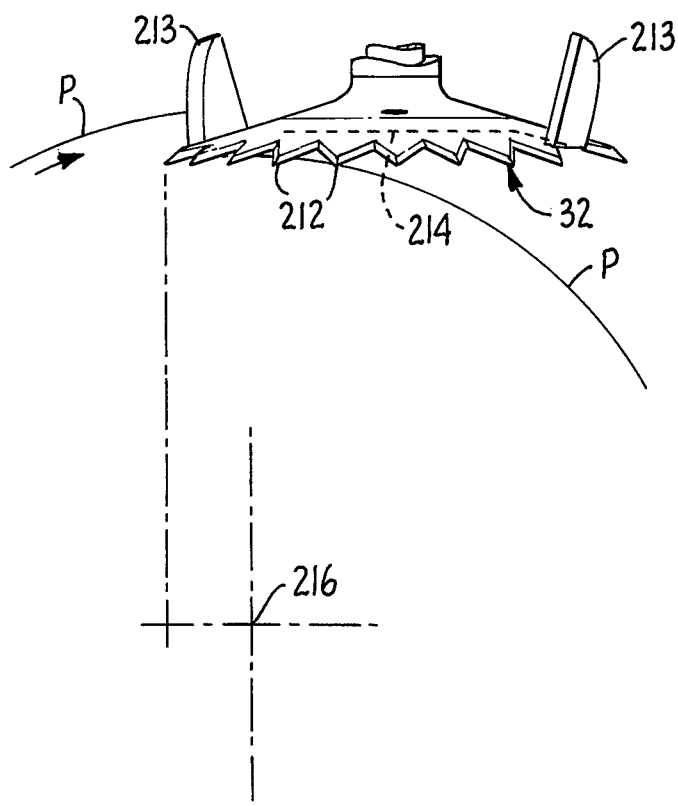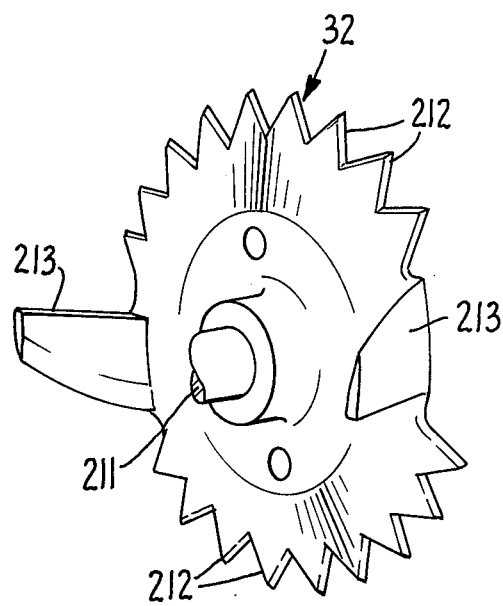
FIG. 22.
FIG. 23.
FIG. 20.
FIG. 21.

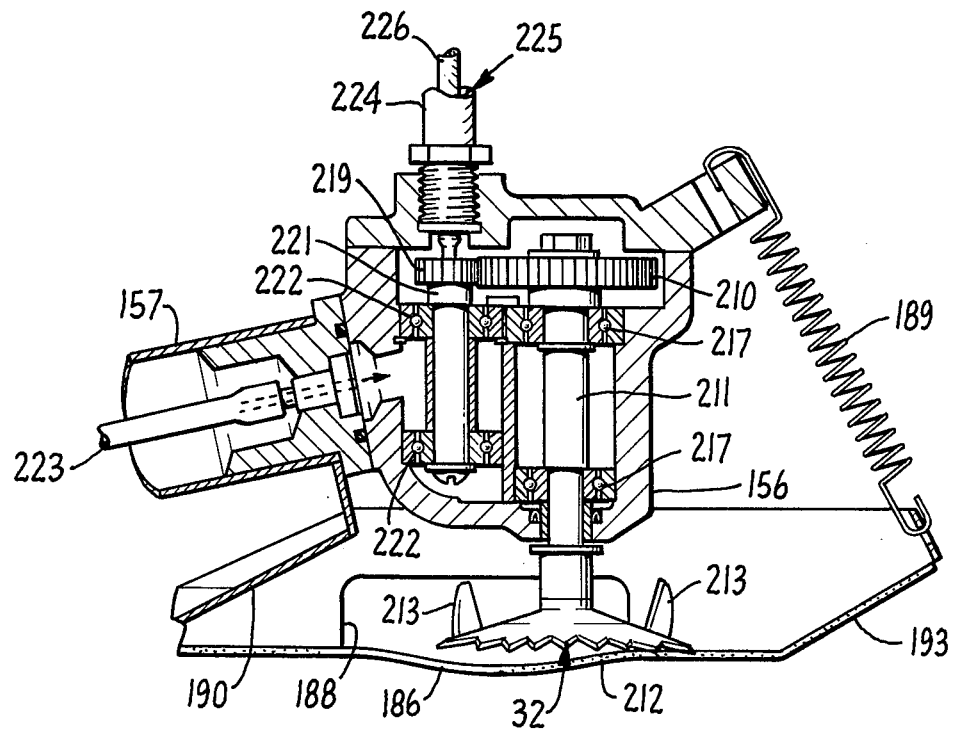
FIG _24_
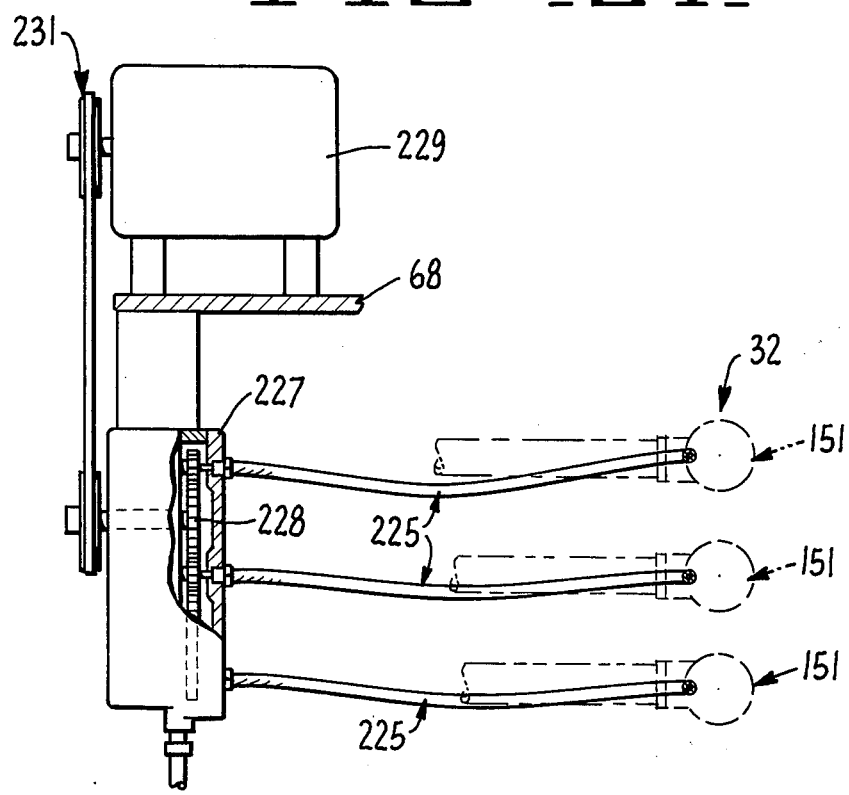
FIG _25_

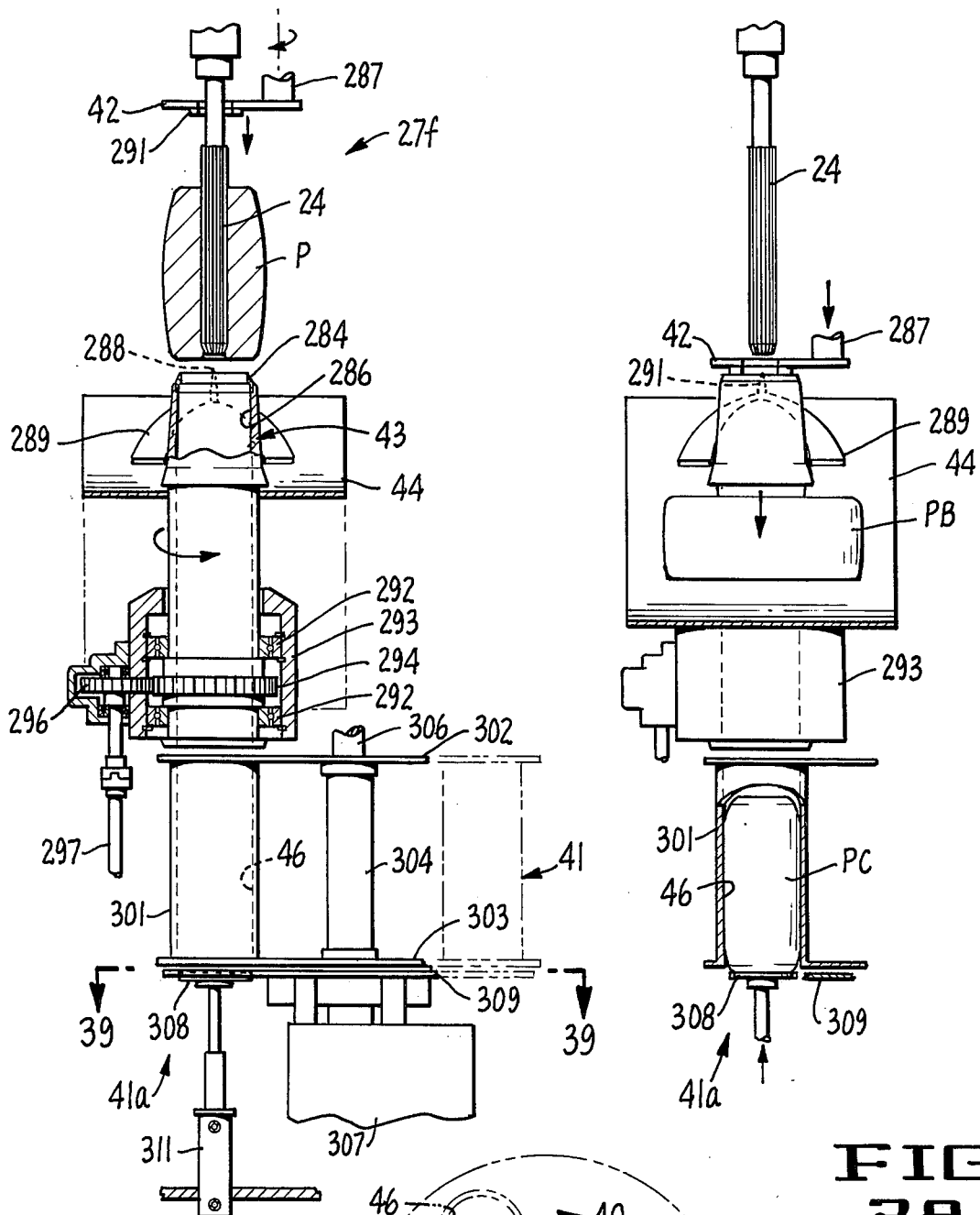
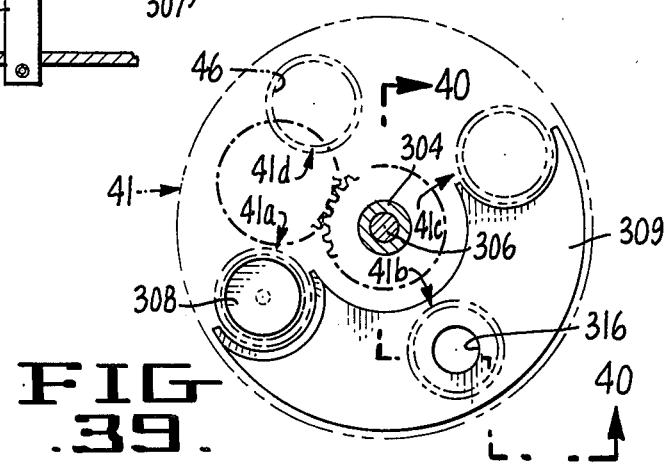
FIG. 37. FIG. 38. FIG. 39.

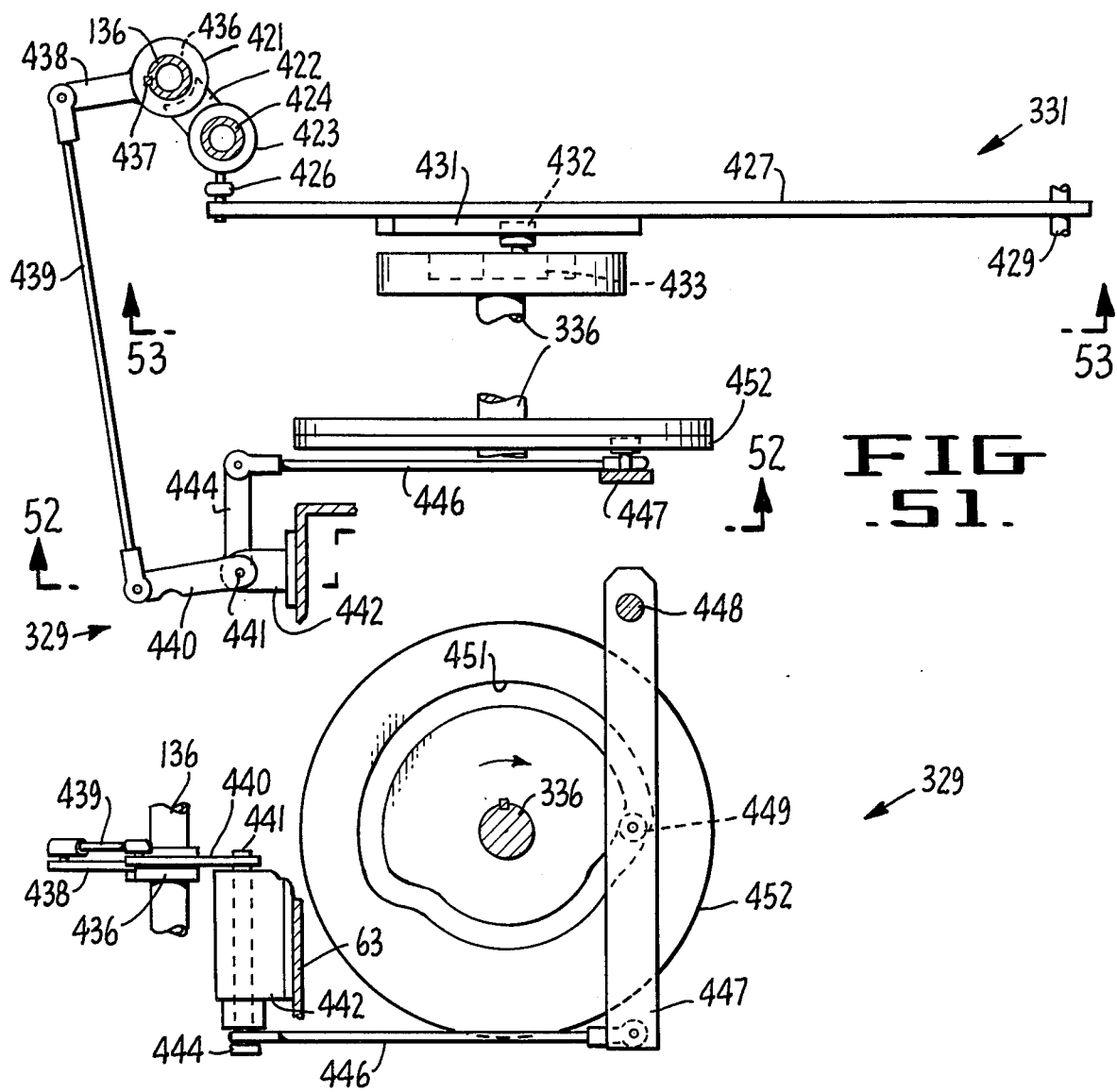
FIG. 51.
FIG. 52.
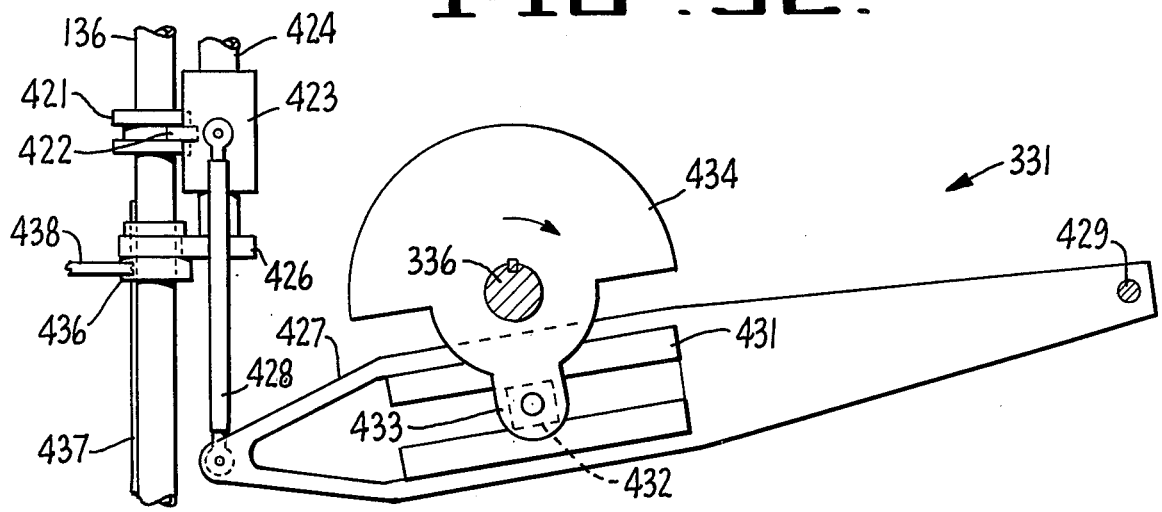
FIG. 53.

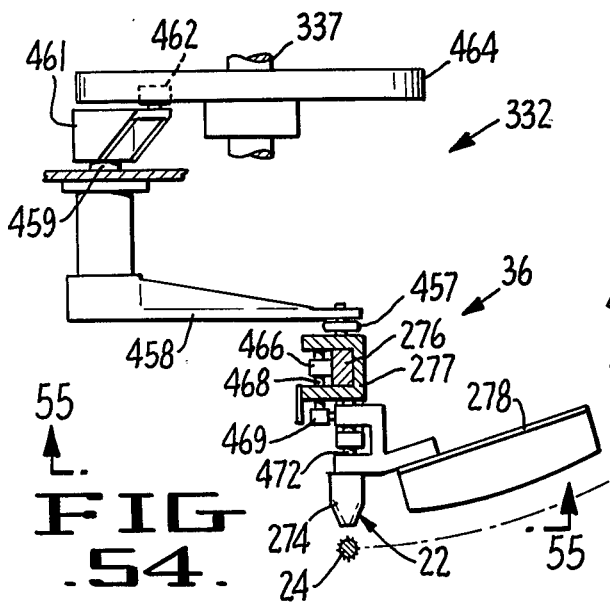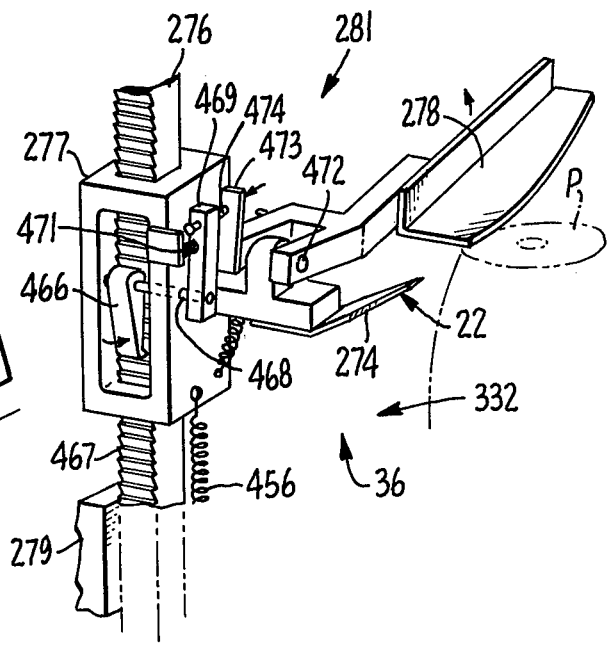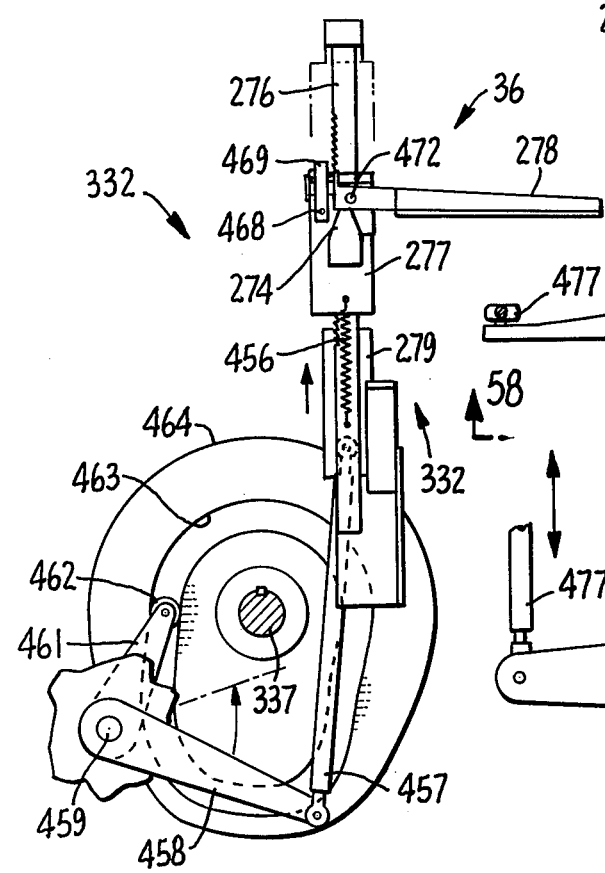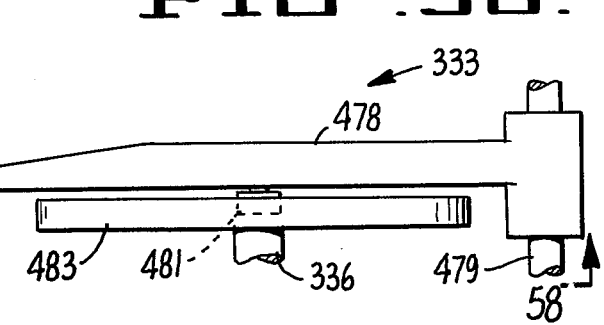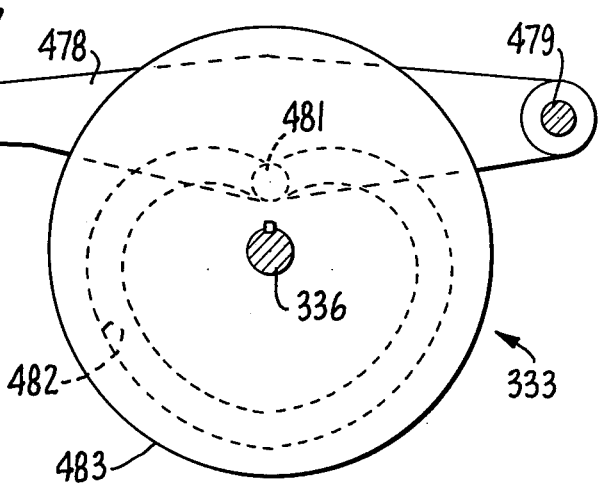

| Operation | 0° — 360° timing |
|---|---|
| CONVEYOR FEED TO DRILLS — FIGS 3 & 6 | FEED |
| HEIGHT SETTING UP & DOWN — FIGS 6, 43 & 44 | DWELL \| MOVE DOWN \| DWELL \| MOVE UP \| DWELL |
| HEIGHT SETTING SWING — FIGS 8, 43 & 45 | DWELL \| MOVE IN \| FOLLOW & MOVE OUT \| OUT & STOP \| DWELL |
| CORE PUSH OUT — FIGS 6, 47 & 48 | MOVE UP \| DWELL \| MOVE DOWN \| DWELL |
| PUSH ONTO PEELING SPINDLE — FIGS 11, 49, 50, 51 & 53 | PUSH ON \| RETURN |
| PUSHER SWING — FIGS 8, 49, 50, 51 & 52 | DWELL \| MOVE OUT \| DWELL \| MOVE IN |
| DRILL & PEELING TURRETS INDEX — FIGS 3, 6 & 13 | DWELL \| INDEX |
| PEELING SPINDLES ROTATE — FIGS 13, 26, 27 & 28 | 1 REV. CLUTCH ENGAGED — ROTATE 1.1 REV. \| CLUTCH DISENGAGED — STOPPED |
| SWEEP CHIPS OFF PEELING HEADS — FIGS 13, 14 & 15 | DWELL \| MOVE OUT \| MOVE IN |
| TOP TRIM KNIFE — FIGS 36, 54 & 55 | DWELL \| MOVE UP \| DWELL \| MOVE DOWN |
| PUSH OFF PEELING SPINDLE — FIGS 39, 49, 50, 51 & 53 | PUSH OFF \| RETURN |
| INDEX CORING TURRET — FIG 37 | DWELL \| INDEX \| DWELL |
| FINAL CORE — FIGS 39, 57 & 58 | MOVE UP \| DWELL \| MOVE DOWN |

FIG. 59.

METHOD AND MEANS FOR PEELING PINEAPPLES

SUMMARY OF THE INVENTION

Heretofore, pineapples have been prepared for canning by making a rotary cut to remove the outside skin and eyes and reduce the pineapple to a cylinder. After the peeling cut, the butt and crown ends are removed. Thereafter, a central cut is made to remove the fibrous core so that all that remains is a hollow cylinder with the skin and eyes removed to a greater or less extent. In the interest of economy, the outer cylindrical cut is made of as large a diameter as possible. As a result, in the great bulk of the fruit, the eyes on the fruit are not removed at each end of the cylinder. This is because pineapples are ovoidal in shape with eyes extending inwardly as much as five-eighths or more. The cylindrical cut passes through the outer surface at the curved ends of the ovoid. The machine on which such a cylindrical cutting operation is performed is well-known in the art and is commonly referred to as a "GINACA"; see U.S. Pat. Nos. 1,039,926, 1,060,248, 1,060,249, 1,060,750, 1,065,309, 1,075,031 and 1,112,130.

The cutting of the pineapples on a Ginaca is subject to several objections. One is that any eyes remaining on the outer surface of the cylinder adjacent the ends must be removed by hand trimming. This is a time-consuming and expensive operation. Another objection is the loss of good pineapple meat in the middle of the ovoidal shell cut from the fruit. Because so many eyes are present in any meat extracted from the shell, the only practical use to which this can be put is to release the juice and recover this by filtration. The saleability of the juice is only at a lower price than the various forms of the solid meat. Finally, the Ginaca machine becomes more and more wasteful as the fruit size becomes larger for a given size cylindrical peeling cut.

In accordance with this invention, means are provided for peeling a pineapple in such fashion that the maximum amount of the pineapple is recovered in such form that it can be used as either sliced, chunk or crushed pineapple suitable for canning and wherein only a minimum amount of the pineapple is in such form that it can only be used for juice or for cattle feed.

The machine of the present invention particularly comtemplates selective peeling of separated areas of the pineapple by spaced peeling devices at different stations such that the spaced cutters can be selectively disposed about the pineapple to achieve its peeling with the removal of the skin and eyes to a specified depth to rid the inner meat of the pineapple of these, all with a minimum of hand-trimming labor.

It is a principal object of the present invention to provide a machine which will automatically remove the skin and eyes from a pineapple so that hand trimming is eliminated or minimized.

It is another object to provide a machine which will make tandem peeling passes on the fruit and which will separate the skin containing peelings from the peelings which contain mostly meat and substantially no skin.

Another object is to provide a machine which will produce ovoid shaped peeled fruit which has all the eyes removed with a minimum waste of the fruit and with little or no hand trimming necessary.

Yet another object is to provide a machine which will permit cutting the peeled ovoid into a cylinder, subsequently recoring the cylinder for the preparation of can size slices while recovering the excess outer blanket of the fruit for diversion into a particulate material fraction which is useful as "crush" pineapple rather than only as pineapple juice.

A further object is to prepare a pineapple for subsequent canning operations by selectively peeling and trimming the pineapple in a manner dependent on the contour of the particular pineapple.

A still further object is to so prepare a pineapple by gauging the size of the particular pineapple and setting the cutting and trimming knives by the gauges in such a manner that the gauges engage the pineapple over an enlarged surface area and do not squash the pineapple.

BRIEF DESCRIPTION OF THE DRAWINGS

FIG. 6 is a fragmentary view showing the mechanism adjacent the infeed station of the machine.

FIG. 7 is an enlarged side elevation of a portion of the structure of FIG. 6 showing the detail of the construction of the core drill.

FIG. 8 is a plan section taken along the line 8—8 of FIG. 6.

FIG. 9 is a fragmentary elevational view taken along the line 9—9 of FIG. 8.

FIG. 10 is a view taken along the line 10—10 of FIG. 8.

FIG. 11 is a view taken along the line 11—11 of FIG. 8.

FIG. 12 is an enlarged plan section taken along the line 12—12 of FIG. 11.

FIG. 13 is a fragmentary side elevation taken along the line 13—13 of FIG. 3.

FIG. 14 is a side elevation taken along the line 14—14 of FIG. 3.

FIG. 15 is a fragmentary view taken along the line 15—15 of FIG. 13.

FIG. 16 is a side elevation taken along the line 16—16 of FIG. 13.

FIG. 17 is a plan section taken along the line 17—17 of FIG. 16.

FIG. 18 is a section taken along the line 18—18 of FIG. 17.

FIG. 19 is a section taken along the line 19—19 of FIG. 17.

FIG. 20 is a plan view showing the cutter in relation with a pineapple to be peeled.

FIG. 21 is a perspective view of the cutter.

FIG. 22 is a view of the upper side of the cutter.

FIG. 23 is a section taken along the line 23—23 of FIG. 22.

FIG. 24 is a section taken along the line 24—24 of FIG. 16.

FIG. 25 is a side fragmentary elevation showing the drive mechanism utilized for the peeling heads.

FIGS. 37 and 38 are front elevational views partly in section taken along line 37—37 of FIG. 3, illustrating the cutting of the pineapple to cylindrical shape and the formation of the crush blanket.

FIG. 39 is a section taken along the line 39—39 of FIG. 37.

FIG. 51 is a fragmentary plan view of the pineapple elevating and push off mechanism and the drive therefor.

FIG. 52 is a fragmentary elevation taken along the line 52—52 of FIG. 51 and showing the drive for the pusher swing mechanism.

FIG. 53 is an elevational view taken along the line 53—53 of FIG. 51 and showing the drive for the pusher up-down mechanism.

FIG. 54 is a fragmentary plan view of the top trim knife mechanism and drive therefor.

FIG. 55 is an elevational section taken along line 55—55 of FIG. 54.

FIG. 56 is a fragmentary perspective of the latch mechanism used with the top trim knife.

FIG. 57 is a fragmentary plan view of the final core mechanism and drive therefor.

FIG. 58 is an elevational view taken along line 58—58 of FIG. 57.

FIG. 59 is a timing chart of the various drives and mechanisms.

DESCRIPTION OF THE PREFERRED EMBODIMENT

Figure 1:
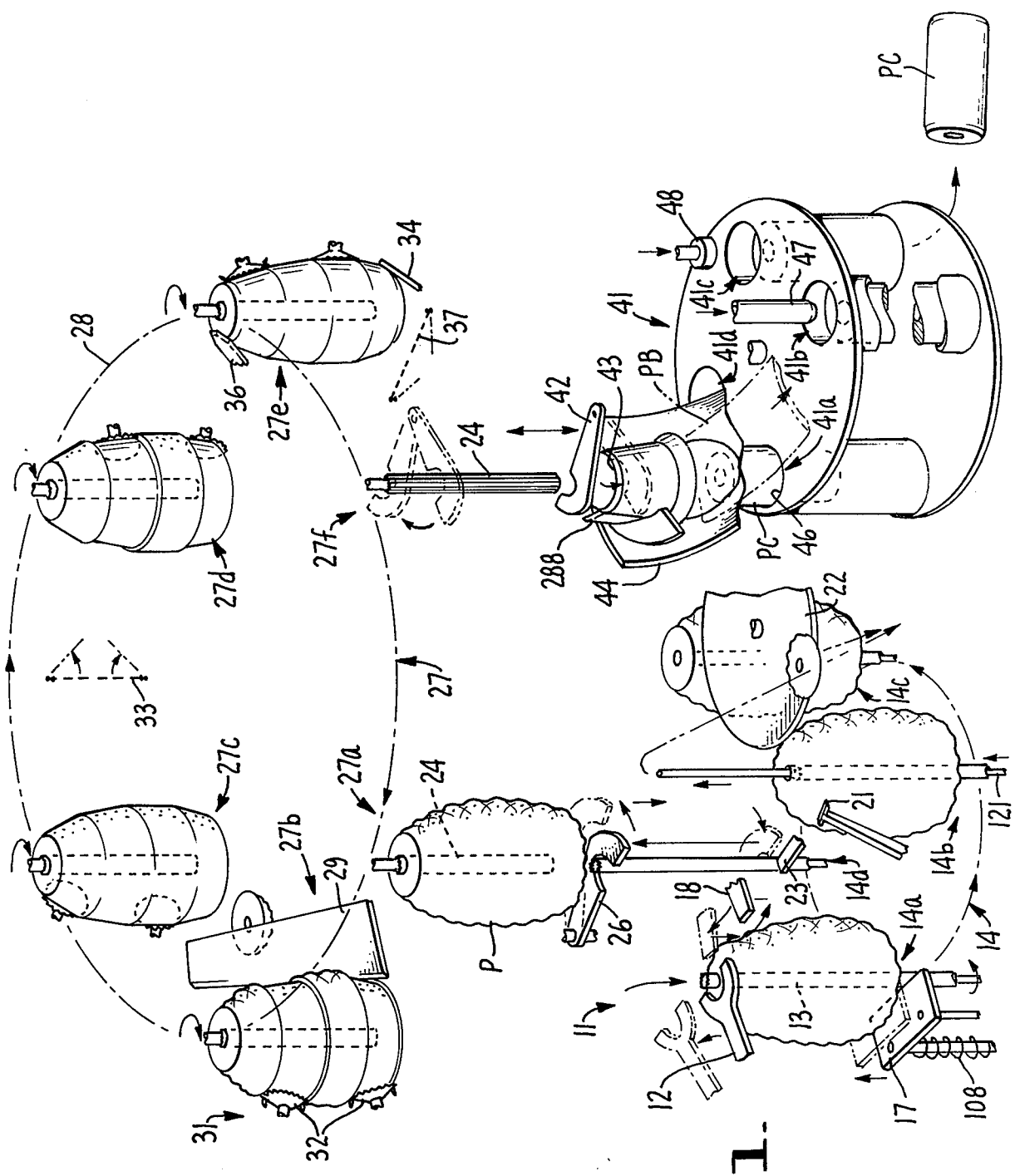
FIG. 1 is a diagrammatic view illustrating the several operations which are carried out in peeling and coring of a pineapple and producing a cylinder and a crush blanket.

By way of an introduction to the detailed operation of the machine, the following is set forth in conjunction with the diagrammatic showing of FIG. 1.

The machine may be fed by any of the conventional pineapple feeding systems wherein an operator orients the fruit and places it in a pocket, the requirement being that the pineapple P reaches an infeed station in a timed relationship and moving downwardly with its core axis vertical. The pineapple passes through a centering head of a type well-known in the trade and shown in Ginaca U.S. Pat. No. 1,060,248. Conventionally, it is pushed by feed lugs 12 on a conveyor chain, the lugs being timed with the machine to enter a pineapple when the system is stationary between indexing movements. Upon passing out of the centering head and while still being pushed by a chain lug, the pineapple encounters a core drill 13 which cuts an axial core hole through the pineapple. The core hole is about ¾ inch in diameter.

The core drill 13 is one of four such drills extending vertically and equally spaced on an indexable turret 14. At the first station 14a of the turret, a core drill 13 is positioned centrally under the centering head. Second station 14b is a core eject station followed by a cut off blade 22 which removes the upper end of the pineapple during the movement to the third station 14c which is an idle station. The fourth station 14d is the discharge station of the infeed turret 14 and its function will be described later.

Upon completion of the cutting of the core hole, the pineapple will have been pushed by feed lug 12 about ½ inch past the end of the core to ensure drilling all the way through. The feed lug is permitted to back up by a mechanism well-known in the art. The pressure of the feed lug is effective to depress a spring supported platform 17 which is under the lower end of the pineapple. The spring strength is somewhat stronger than the weight of the pineapple so that the spring will push the pineapple upward when feed lug 12 is withdrawn.

Just prior to the withdrawal of the feed lug, a height setting finger 18 moves in over the descending pineapple and moves down to a preset level. As feed lug 12 withdraws, the pineapple rises to the finger 18 under the pressure of the spring platform 17 lifting the pineapple to a fixed height.

As turret 14 indexes at the first station carrying the pineapple which has just been impaled on a core drill 13, finger 18 moves along with the pineapple, thus maintaining the level against the upwards thrust of the spring supported plate 17. After the first couple of inches of travel, a sharp flat blade 21 is pressed into the side of the pineapple to maintain the height of the fruit so set. Then finger 18 lifts and goes back to engage the next pineapple. After the pineapple is engaged by blade 21, the pineapple continues forward and moves off spring platform 17 so that the platform can receive the next pineapple.

Figure 3:
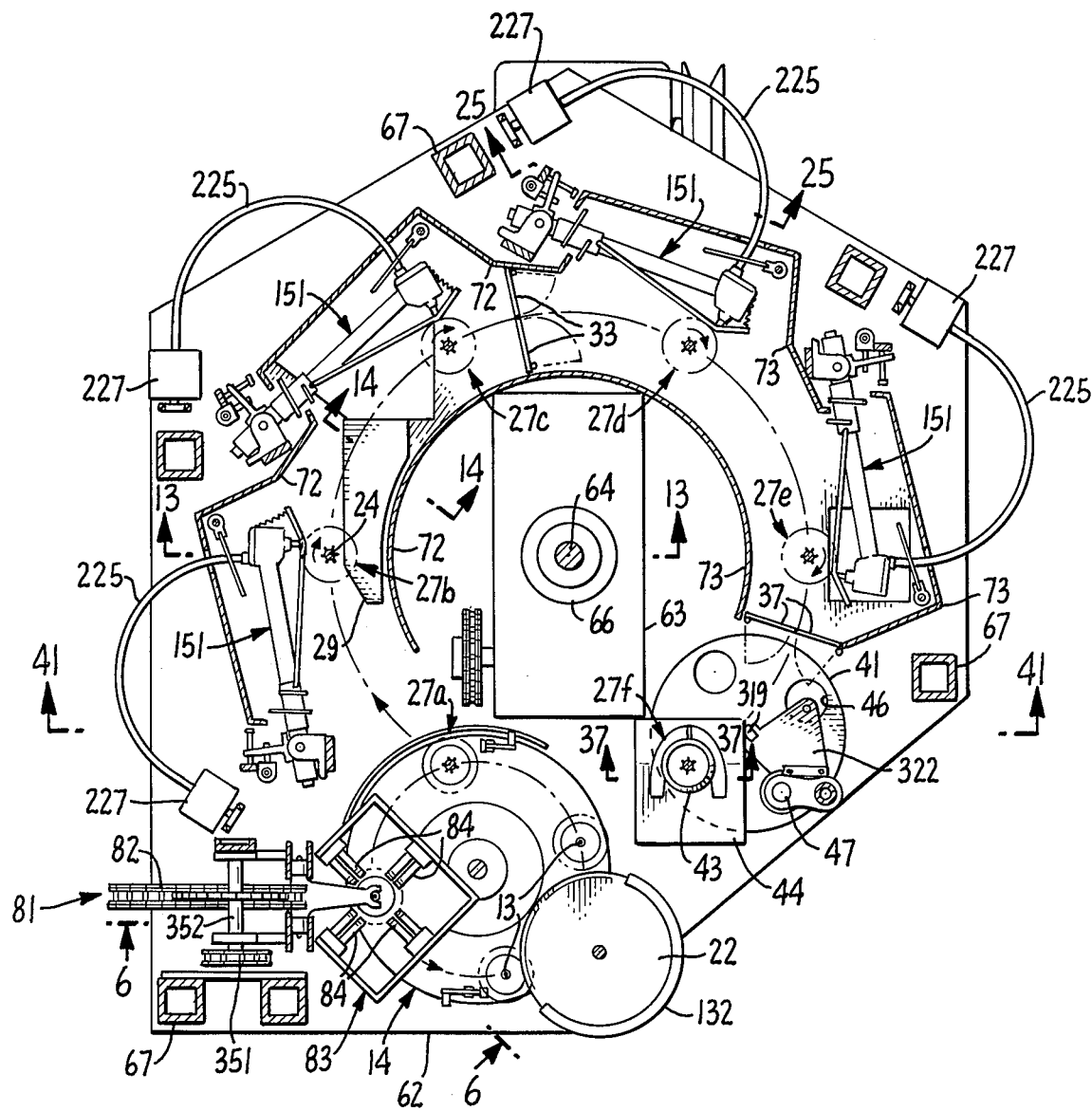
FIG. 3 is a plan section taken along the line 3—3 of FIG. 2 showing the location of various elements of the machine.

Upon completion of the first index, the pineapple has been cut nearly to the core by rotating knife 22 which is used to cut off the upper end of the pineapple (FIG. 3). By selectively setting the height of the finger 18, as mentioned in the preceding paragraph, more or less of the upper end of the pineapple can be cut off.

During the dwell at the end of the first index, the core within the core drill is pushed upwards out of the core tube into a chute directing it to a conveyor carrying away the material for juice. During the next index (the second index), the upper end of the pineapple is fully cut off and is discharged into a chute carrying it to the skin conveyor. The dwell at the end of this index is idle. The next index (the third index) releases blade 21, allowing the pineapple to drop onto cushion springs 23 below the drill. At the completion of the third index, the core drill 13 at station 14d is directly in alignment with a finned peeling spindle 24, the lower end of which is about an inch above the top end of core drill 13.

A lifting member 26 then pushes the pineapple from the core drill and presses it onto the peeling spindle 24. The height setting of the pineapple pusher 26 controls the amount the pineapple projects beyond the end of the spindle 24 to permit cutting off the lower end of the pineapple.

The finned peeling spindle 24 has multiple fins projecting radially outward about ⅛ inch and extending longitudinally of the spindle to a distance greater than the length of the longest pineapple anticipated. Since the core drill made a hole ⅜ to ½ inch smaller than the actual core size, the fins engage the fibrous core so that torque can be applied to rotate the pineapple at the peeling stations. The peeling spindles 24, six in number, depend from a peeling turret 27 on disc 28 and are equally spaced on a large circle. The disc indexes in time with the turret 14.

As a peeling spindle moves from the loading station 27a to the first peeling station 27b, it encounters a fixed knife blade 29 set just below the lower end of the peeling spindle and diagonally transverse to it. Upon completion of this movement, the knife has cut the pineapple about ½ inch from its lower end and to a depth about to the core fibers. At the end of the first peeling spindle index movement, the pineapple encounters the first array of peeling cutters 31 which are mounted to conform to the axial shape of the pineapple as will be more fully described hereinafter.

When the fruit reaches the first peeling station 27b, the peeling spindle 24 is rotated a single revolution plus a small amount more to overlap the start and finish of the cutters and an array of rotating toothed cutters 32 cut a series of bands around the pineapple. The rotation of the fruit at this station also causes the bottom cut-off knife 129 to cut completely around the fruit down to about the core.

After the first revolution is made, the fruit is indexed to the next peeling station 27c. As it moves forward, it passes along the bottom cut-off knife 29, which projects into the pineapple to sever the core and allows the lower end of the pineapple to drop into the skin collecting chute. When the pineapple reaches the second array of cutters, the cutters once again move to conform to the shape and diameter of the pineapple. The cutters at station 27c are so arranged as to peel the alternate uncut bands on the pineapple left by the preceding set of cutters. The array of cutters at the first and second peeling stations 27b and 27c perform a first pass called the skin or bran pass which will only be deep enough to remove most of the skin material, about 3/16 inch to ¼ inch on medium size fruit.

Surrounding the first and second cutter arrays is a collecting housing which keeps the peelings confined and directs the peelings to a chute and conveyor which remove the peelings to the cattle feed preparation machinery. As the pineapple indexes to the next or third peeling station 27d, it pushes open swinging doors 33 which have kept the skin peelings in the first housing.

The doors close behind the pineapple to close the passage from the housing. The fruit advances and is peeled in an identical manner at station 27d, as was done with the first cutter array at station 27b, just deep enough to remove the eyes. On medium fruit this will be 5/16 inch to ⅜ inch for a total depth of from ½ inch to ⅝ inch.

The next index brings the pineapple to a fourth peeling station 27e which completes the peeling in the same manner as was done by the second array of cutters at station 27c. In addition, the bottom and top corners of the ovoid are trimmed by knives 34 and 36 at an angle which is normal to the bisector of the respective corner angle.

The bottom trim knife 34 is fixed but the top trim knife 36 is attached to a mechanism which finds the top of the pineapple as it advances toward the final peeling station 27e and locks the mechanism at the proper height to trim the top corner of the ovoid. These two trim knives remove any deep eyes which might remain at the angular junction of the flat and curved surfaces of the fruit.

Upon completion of the last stage of peeling, the pineapple is indexed out of the housing which catches the peeling chips from the second stage peeling by passing through the swinging doors 37. At the end of this index, the pineapple is at the peeling turret discharge station 27f. Here the pineapple may be discharged from the machine for inspection and further processing or transferred to another turret 41 where the pineapple may be cut into a cylinder, recored and discharged from the machine.

In either event, a pusher 42 engages the top of the pineapple adjacent the peeling spindle and pushes the pineapple off the spindle during the dwell period. If the fruit is to be discharged for inspection, it is pushed into a chute and directed to an area for further processing. If the pineapple is to be cut into a cylinder, it is pushed through a rotating knife 43 which is centered below the fruit a short distance. The knife revolves at 200–300 rpm and slices the ovoid into a cylinder PC and a blanket of meat PB which is in excess of the cylinder diameter. The blanket is cut along one side so that it can expand and flatten out as it leaves the rotating knife and slides down a chute 44 with the outside surface uppermost.

As the cylinder traverses the inside of the rotary knife, it is guided into the cylindrical pockets 46 of a recoring turret 41. One pocket of the turret is centered below the rotary knife at station 41a at the time the cylinder PC reaches the turret. When the turret 41 has indexed to the next station 41b, a hollow recoring tube 47 is thrust centrally through the cylindrical pocket 46 cutting the undersize core hole to a larger size as required by the core fiber of the pineapple. This is about 1 3/16 inch to 1 ¼ inch diameter for medium size pineapples. The core material is ejected out of the core tube while it is at the bottom of its stroke. The recoring tube retracts before the turret moves into its next index.

At the next index the pineapple in the pocket slides off a support plate carried underneath turret 41 and it either falls by gravity into a discharge chute, or is pushed out by a pusher 48 attached to the recoring slide.

A fourth position 41d of turret 41 is an idle position.

This finishes the peeling, sizing and recoring operations and results in a so-called "crush blanket" and a conventional cylinder which is somewhat bullet nosed at both ends substantially the same as it appears after the trimmers have trimmed it to remove the eyes following the Ginaca operation. It is essentially a pre-trimmed Ginaca cylinder since no hand trimming is required to remove the eyes left by the present Ginaca machine. This is one of the valuable economies achieved with contour peeling. Another economy is the crush blanket which was formerly only made into juice. Now, being free of eyes, it is upgraded into solid meat of a considerably higher value than juice. The extra yield of this solid meat amounts to up to 25% more than obtained with the Ginaca on the medium sized fruit. Another economy may be realized by recoring the ovoid separately. It may then be made into chunks directly at a further increase in value over the crushed material for increased yield.

A more detailed showing of the preferred embodiment is shown in FIGS. 2-40 while FIGS. 41-59 more fully illustrate an integrated drive system for performing the various functions in a timed sequence.

FIGS. 2-5 and 13 illustrate the overall machine which includes a frame 61 having a base 62 and a centrally located column 63. Peeling turret disc 28 is rotatably supported at the upper end of column 63 on output shaft 64 of indexing mechanism 66. Upstanding frame members 67 support upper frame 68 surrounding peeling disc 28. Z-shaped bracket members 69 support a top plate 71 above disc 28. Other intermediate frame members support the indexing mechanism for the infeed drill turret 14, final coring turret 41 and other stationary supports and housings.

As mentioned, the first and second array of cutters and the third and fourth array of cutters are confined respectively in housings 72 and 73 which confine and segregate the peelings produced. Swinging doors 33 separate housing 72 from housing 73 and swinging doors 37 separate housing 73 from the final sizing and coring stations.

The peeling waste from housing 72 is discharged through chute 74 from whence it may be further processed into cattle feed, mill juice or otherwise used. The peelings from housing 73 are of a higher quality and are discharged through chute 76 to be further processed into juice.

The peeling turret 27, infeed drill turret 14 and final coring turret 41 rotate about vertical axes and respectively support the peeling spindles 24, core drills 13 and supporting pockets 46 in a path equidistantly spaced about the respective axes. The paths of the turrets intersect at the transfer stations and the drills, spindles and pockets are indexed into alignment thereat. The peeling spindles 24 depend from the peeling turret disc 28 while the core drills 13 upstand from turret 14 and support pockets 46 are vertically contained within turret 41, the transfer being made vertically at the transfer stations.

It is intended that pineapples fed to the machine of the present invention be graded as to size, these being small, medium and large depending upon diameter of the pineapple. It is considered that the diameter is indicative of the over-all length of the pineapple and that fruit of the smallest diameter will be relatively short while that of a medium diameter will be in an intermediate range and the longest fruit will have the largest diameter. It is also the practice in the canneries to handle fruit of a given size range on a machine having a given adjustment. Thus, small fruit would not be fed to a machine set to handle medium or large fruit and vice versa. This machine has provision for being adjusted to optimally handle the various size ranges.

Pineapples so graded are loaded between infeed lugs 12 on infeed conveyor 81. Infeed conveyor chain 82 carries lugs 12 at spaced points therealong and is timed in a sequence with the infeed drill turret 14; see FIGS. 2 and 6.

The conveyor 81 presents a pineapple with its axis in a vertical direction over the infeed drill spindle. The pineapple is centered about the axis of the spindle by a centering device 83 known in the trade as a "Lister" head. Basically, the centering device 83 has wiper arms 84 depending from horizontal shafts 86. Diametrically opposed wiper arms 84 are interconnected by centering levers 87 and are urged by springs 88 toward the central axis of the centering head. As a feed lug 12 conveys a pineapple between arms 84, the pineapple is centered along an axis which is coaxial with infeed core drill 13 at the first station of core drill turret 14.

Infeed lug 12 is pivotally carried on conveyor chain 82 on pivot pin 80 and is held outwardly by a pair of rollers 89 and ears 85 carried in track 91. The outer end of lug 12 is bifurcated to bear on the top of a pineapple at either side of the central axis and to push the pineapple completely onto the rotating core drill 13. When the top of the pineapple is about ½ inch beyond the top of the core drill 13, ears 85 leave the end of track 91 and the feed lug 12 is free to pivot to a position away from the top of the pineapple, as shown in phantom in FIG. 6. The feed lug 12 is forced to retract from the pineapple by the end 90 and subsequently rides along rail 92 to the conveyor loading area.

As the centered pineapple is pushed onto the core drill 13, a central hole is drilled therein which is of a diameter somewhat less than the central fibrous core of the pineapple. To minimize the pressure needed to force the pineapple onto the core drill, the core drill 13 is fashioned to drill the hole with a minimum of axial thrust on the pineapple. The upper end of the core drill has teeth 93 each of which has a leading vertical edge 94 (FIG. 7). The drill is rotated at a rate such that the vertical edges 94 drill the hole without the fruit contacting the sloped surface 95 of the teeth. Below the serrated end, the core drill tube is relieved with an enlarged inside diameter 96 for receiving the drilled core of the pineapple. The lower end of the core drill is removably supported in a collet arrangement 100 on the upper end of each drill spindle 105. The core drill spindle 105 is supported by spaced bearings 97 suitably retained and sealed in infeed turret 14. Each drill spindle has gear 98 meshing with central gear 99. Central gear 99 is supported coaxially with turret 14 on shaft 101 and is continuously rotated by motor 102 through belt and pulley drive 103 (see FIGS. 2 and 6).

Subjacent the infeed station 14a, spring supported platform 17 is positioned to be engaged by the bottom of an incoming pineapple and be depressed thereby (FIG. 8). The spring platform is supported by rod 104 and guide rod 106 spaced on frame 107 and journaled for vertical axial movement thereon. Spring 108 is positioned between frame 107 and a collar 109 on rod 104 and exerts an upward pressure on platform 17 with a force greater than the weight of an incoming pineapple P. FIG. 6 shows how spring supported platform 17 is depressed by a large pineapple PL (solid line) and a smaller pineapple PS (phantom line).

Before infeed lug 12 is retracted, height setting finger 18 moves to a position above the drilled pineapple. As infeed lug 12 is retracted, spring platform 17 elevates the pineapple toward finger 18 while the finger is lowered to a predetermined position above the top of the drill spindle. This positions the top of the pineapple above the top of the drill spindle prior to the cutoff of the upper end of the fruit. To maintain this elevation of the pineapple on the drill spindle, a sharp flat blade 21 (FIGS. 9 and 10) is brought into contact with the pineapple. Blade 21 is carried at the upper end of arm 111, pivoted at 112 on turret 14 and biased by spring 113 to be pivoted toward drill spindle 13 whereby the blade is jabbed into the side of the pineapple. At the infeed station 14a rail 114 depresses roller 116 to swing arm 111 away from core drill 13 out of the way of the incoming pineapple. As the turret 14 turret indexes 14 from the infeed station 14a to the next station 14b, height setting finger 18 moves along a short distance to track the course of the pineapple. Roller 116 leaves rail 114 and arm 111 swings to jab blade 21 into the side of the pineapple and maintain the height so set. The pineapple continues to index and leaves spring platform 17 while finger 18 moves upward prior to moving over to the next succeeding incoming pineapple.

Turret 14 is supported on hollow shaft 117 and is rotated a quarter turn through gear train 118 by indexing mechanism 119 which indexes core drill 13 successively to each of four stations. After the first index of turret 14, the pineapple carried on the core drill 13 arrives at the second station 14b where the core material is removed from the core drill and ejected into a suitable chute to be carried to the juice processing area. Core ejector rods 121 are carried within each drill spindle (see FIG. 6). The lower ends of rods 121 have pads 122 which ride on segmented annular rails 123 and 124. At second station 14b a rail segment 126 is elevated to push the core ejector rod 121 upward into core drill 13 and eject the core as shown in FIG. 6.

Rail 123 is at a lower elevation for supporting the core ejector rod 121 as it indexes through the first station and rail 124 is at a higher elevation for supporting the rods between the second and fourth stations. After the fourth station 14d, rod 121 falls from upper rail 124 onto lower rail 123. As mentioned, rod 121 is elevated between the lower and upper rails at the second station 14b.

The second indexing of turret 14 moves the pineapple from second station 14b to a third or idle station 14c. As the pineapple traverses between 14b and 14c, it is held by flat blade 21 while the upper end of the fruit is severed by a circular rotating knife 22 (see FIG. 10). Knife 22 is supported at the lower end of shaft 127 held in spaced bearings 128 on the frame and rotated by motor 129 through belt and pulley drive 131 (see FIGS. 2 and 3). A guard 132 shields the outer edge of the rotating knife blade 22. The severed top is free to fall into a suitable chute where it is directed to the cattle feed processing area.

The third indexing of turret 14 brings the pineapple to the fourth station 14d where the pineapple is transferred to peeling spindle 24. Midway in the third indexing, the sharp blade 21 is withdrawn from the pineapple when roller 116 contacts rail section 114b. This allows the pineapple to fall free onto leaf springs 23 where it is supported as shown in FIG. 11.

Transfer of the pineapple from core drill 13 to peeling spindle 24 is performed by C-shaped pusher member 26 carried on vertical shaft 136. Shaft 136 is rotatable to bring the C-shaped pusher 26 to a position around core drill 13 beneath a pineapple as shown in the phantom and full line positions of FIG. 8. Shaft 136 is also movable axially to push the pineapple from core drill 13 onto the axially aligned peeling spindle 24 as shown in FIG. 11. The vertical throw of pusher 26 is such that it allows the lower end of the pineapple to project below the bottom of the peeling spindle so that the lower end can be cut off. As mentioned earlier, the diameter of core drill 13 is smaller than the diameter of the fibrous core of the pineapple such that the pineapple will be supported on peeling spindle 24 by the remaining fibrous core material and so resist later applied torque. Peeling spindle 24 has radial fins 37 extending longitudinally along its outer surface. These fins are adapted to support the pineapple securely through the later peeling and trimming sequences.

In the preferred embodiment, six peeling spindles 24 are equidistantly spaced around peeling turret disc 28. Each spindle is journaled for rotation in a bearing hub 138 carried on disc 28. Each spindle shaft extends above hub 138 and carries friction drive disc 139 at its upper end. Thus, the peeling spindle 24 depends from the lower end of the turret disc 28 and the peeling drive mechanism is above the turret disc and isolated from the pineapple and peelers (see FIG. 13).

Peeling turret disc 28 is bolted to the output 64 of indexing mechanism 66 through boss 142. Index mechanism 66 is supported on column 63 and is driven by chain and sprocket drive 143 in a timed sequence by a prime mover as described hereinafter.

At the end of the first peeling turret index, the pineapple is moved from the incoming transfer station 27a to the first peeling station 27b. There are four peeling stations, a first 27b, second 27c, third 27d and fourth 27e, each having an array of peeling cutters 31 which are formed to peel alternate bands of material from the pineapple. The first and second peeling stations 27b and 27c remove the outer skin from the pineapple to a depth of about ¼ inch. The third and fourth peeling stations 27d and 27e remove a greater amount of material to a depth of about ⅜ inch on medium pineapple and remove the remaining eyes from the pineapple. The depth of cut is adjustable as required to suit the eye depth of the fruit being run. Correspondingly, this latter cut removes some usable pineapple meat which may be processed for juice.

Each of the peeling stations has an array of peeling cutters 31 and other structures which are substantially identical at each station. Similarly, each peeling cutter head assembly 151 is substantially identical. Only one such station and one such peeling head will be described in detail, it being understood that the other stations vary only as to number of cutters and settings for depth of cut. Any other dissimilarities will be noted separately.

In FIGS. 13 and 17 it will be noted that the path of the outside of the incoming pineapple contacts the peeling head gauge shoes 152 several inches back from the cutting point as shown by the phantom line. This contact pivots the cutter head assembly 151 on pin 153 to match the diameter of the pineapple as is shown by the solid line. It also forces head 151 to swivel on shaft 154 to conform to the axial shape of the pineapple.

The concept of setting the pineapple to the median plane, spelled out in patent 3,638,696, has been improved. Instead, the pineapple is set to always engage fully the lower cutter 32a of the first and third cutter arrays. As many cutters are provided as are necessary to peel fully the longest pineapple expected. For large sized fruit, the cutter arrays at the first and third stations have three cutters while the cutter arrays at the second and fourth stations have two cutters set to engage the unpeeled paths of the previous cutters.

Each of the cutter assemblies 151 is independently mounted for pivoting and swivel movement to position cutter 32 at the proper radial position and axial attitude for most optimum cutting of the pineapple. This pivoting and swiveling is in response to the contour of the pineapple as determined by gauge shoe 152. Gauge shoe 152 is carried by cutter assembly 151 and contacts the pineapple immediately on either side of cutter 32.

In FIGS. 17-19 the cutter assembly 151 supports cutter blade 32 journaled for rotation in head 156 at the distal end of tubular arm 157. Arm 157 also carries gauge shoe 152. The inner end of arm 157 has a collar 158 fixed to swivel shaft 154. Swivel shaft 154 is journaled in hub 159 on spaced bearings 161 and is biased by clock spring 162 to balance the axis of cutter blade 32 in a plane normal to the path of the peeling turret. Hub 159 is journaled by pivot pins 153 in block 164 carried on frame member 166. Swivel shaft 154 has its axis in the plane of the cutter blade tooth tips. The axis of pivot pins 153 is also in this plane and transverse to the axis of the swivel. Pivoting about pins 153 allows arm 151 to swing from the phantom line position to the full line position in FIG. 17 as determined by the radius of the pineapple when the pineapple moves into the peeling station.

This pivoting movement is restricted to prevent cutter-spindle contact by bifurcated finger 167 carried by swivel hub 159 contacting stop 168 when the cutter assembly swings to the inward phantom line position of FIG. 17. The cutter assembly is urged inward toward the pineapple by air pressure from line 171 acting on a fluid which powers single piston 172 against adjusting screw 173 on finger 167. The inlet port of piston cylinder 174 has a restricted orifice which dampens any violent swinging action. Stop 168 and piston cylinder 174 are carried on frame member 176. The swivel action of arm 157 is also restricted by stops 178 carried on boss 179 and are adjustable to contact ears 181 of collar 158.

The lowermost cutter 32a of cutter array 31 is positioned so that it extends beyond the lower end of the pineapple and, as such, the lower portion of gauge shoe 152 has nothing to bear against. Proper positioning of stop 178 limits the degree of swivel of this lower cutter to a suitable angle. Similarly the swivel of the upper cutter of the array is restricted to prevent the cutter from swivelling too far toward the spindle on a short pineapple.

Gauge shoe 152 is adjustable to allow for variations in cutter depth. As shown in FIG. 16, 17 and 19, gauge shoe 152 is formed by a pair of longitudinal angle members 183 and 184 pivoted at their inner ends on collar 158 and extending therefrom toward either side of cutter blade 32. The angle face which contacts the pineapple has a flexible band 186 affixed thereto by fasteners 187. The angle members 183 and 184 are recessed as at 188 in the cutter area while flexible band 186 bridges this gap and provides a cradle for the pineapple. This allows the flexible band to twist and more nearly conform to the surface of the fruit which distributes the load of the cutter assembly 151 over an enlarged area. This is especially desirable after the first station where the gauge shoe contacts softer meat and when the processed fruit has a high content of juice.

The inner and outer ends of angle members 183 and 184 are joined by sheet metal structure 190. The outer end of gauge shoe 152 is biased toward cutter head 156 by spring 189. Jack screws 191 are carried in threaded structure 192 of cutter arm 157 and bear against the angle members 183 and 184. Rotation thereof adjusts the position of the gauge shoe 152 relative to the face of cutter blade 32. This permits a ready adjustment of the depth of peel. Normally, if a change of depth adjustment is made, it is only necessary to adjust the array of cutters at the first and third peeling stations 27b and 27d, the cutters at the second and fourth stations 27c and 27e being initially adjusted to blend with the preceding cutter paths.

The shape of the cutter depth gauge 152 is to contact the incoming fruit and swivel cutter head 156 to a plane perpendicular to the outer surface of the pineapple while pivoting head 156 outward to match the fruit diameter. The cutter teeth can only readily cut in a radial direction so that the cutter must be at the correct depth and attitude when it encounters the fruit. The small bend in angle members 183 and 184 adjacent the cutter and just beyond lifts the cutter a small amount as the fruit departs, preventing the cutter from making a cut with the far side teeth as the pineapple passes under them. A long slope 193 at about 45° allows the head assembly 151 to follow easily behind the receding pineapple. It also enables the machine to be backed up with fruit on the spindles without jamming.

Sheet metal structure 190 is fashioned to prevent some of the peelings of the pineapple from flying toward the cutter arm 157. However, it has been found that peelings nevertheless accumulate on the top of cutter head 156 and upset the balancing function of clock spring 162. Therefore, at each peeling station, a cutter head wipe off mechanism 196 is provided. As shown in FIGS. 13-17, a wiper blade 197 is pivotally supported on shaft 198 above each peeling cutter head 156. Rotation of shaft 198 will sweep blades 197 across heads 156 and dislodge any peelings accumulated thereon. Rotation of shaft 198 is performed by cam 199 carried on peeling turret disc 28. Cam 199 contacts cam follower 201 when turret 27 indexes and swings arm 202 about pivot 203 while link 204 transmits the motion to arm 206 attached to the top of wiper arm shaft 198. Shaft 198 swings wiper blades 197 over peeler cutter heads 156 following the peeling operation on the next succeeding index while spring 207 returns shaft 198 to the rest position.

As mentioned, stationary flat blade knife 29 severs the bottom end of the pineapple as it is indexed into the first peeling station 27a, rotated thereat by spindle 24 and further indexed away from the first station. The flat blade knife 29 is adjustable vertically to remove more or less of the bottom of the pineapple as desired.

Figure 4:
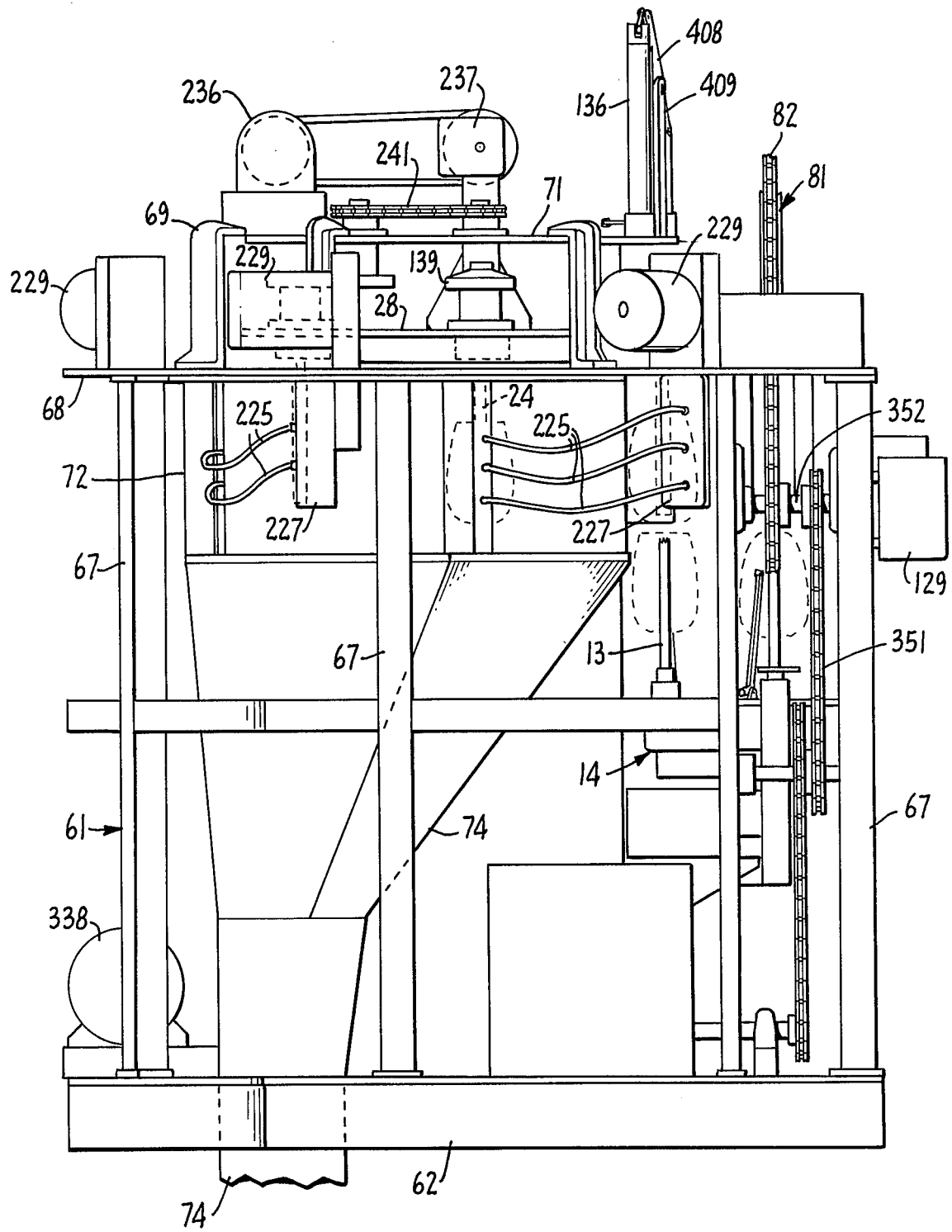
FIG. 4 is a elevational section of one side of the machine taken along the line 4—4 of FIG. 2.
Figure 5:
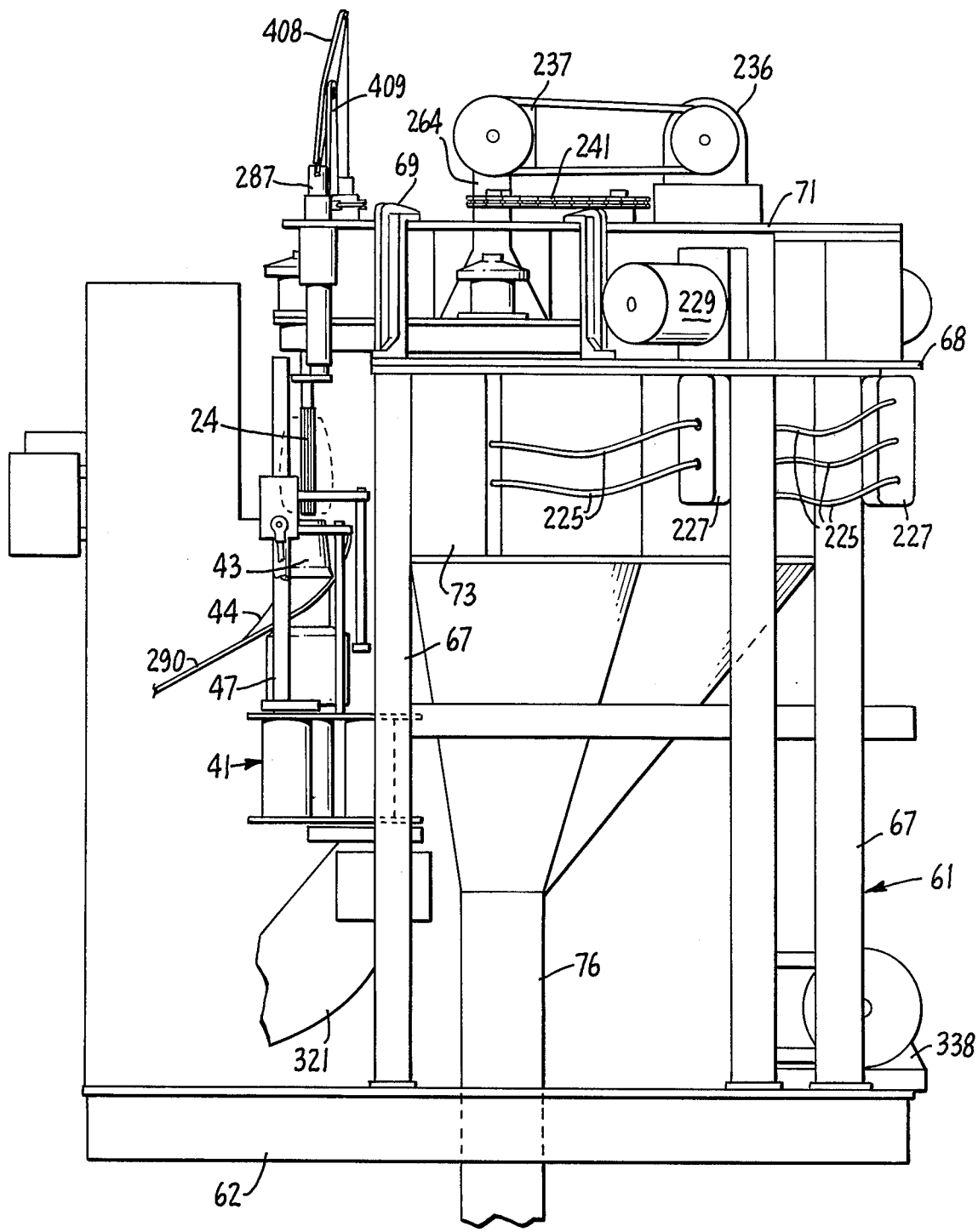
FIG. 5 is an elevational section taken along the line 5—5 of FIG. 2.

As noted, considerable throwing of peelings and waste is performed by the cutters at the peeling stations. To confine these and to direct the separate and individual peeling components to the proper area for further processing, the peeling stations are surrounded by housings 72 and 73, each having a lower discharge chute 74 and 76 (FIGS. 3, 4 and 5). Peeling arm collars 158 have ribs 208 forming a labyrinth with the housings while swinging doors 33 are provided between housings 72 and 73 and swinging doors 37 are provided at the exit of housing 73 to further confine and isolate the peelings.

The peeling is preferably performed by an improved cutter 32 as shown in FIGS. 20-23. The cutters are disc-shaped having a central supporting shaft 211 and a plurality of teeth 212 disposed about the periphery of the disc. The teeth are sharpened at least on their leading edge and may be sharpened on both edges as shown. The cutter is positioned with the side of the disc opposite shaft 211 confronting the outer periphery of the pineapple and with the periphery of the teeth projecting beyond the pineapple centerline counter to the direction of rotation of the pineapple. As the pineapple is rotated by peeling spindle 24, the rotating cutter severs the periphery fibers and lifts a layer of skin or meat. Upstanding spurs 213 on the back face of the cutter 32 cut the severed layer into short lengths as described more fully in U.S. Pat. No. 3,734,002. The improved cutter has a concave face 214 on the side of the cutter confronting the pineapple which allows the cutter to peel a rounded contour more nearly conforming to the profile of the pineapple.

The cutters are generally of about 2¼ inch diameter with spurs 213 cutting a 2 inch wide swath. The toothed periphery of the cutter projects about ¼ to ⅜ inch to the left of the pineapple centerline 216 as viewed in FIG. 20 and it cuts a smooth ovoid shape rather than a scalloped ovoid as with the prior cutter system, thus yielding a few more percent of clean fruit.

Cutter shaft 211 is supported for rotation in spaced bearings 217 in cutter head 156 at the outer end of arm 157. The inner end of shaft 211 carries gear 210 which meshes with gear 219 carried on parallel shaft 221 journaled in bearings 222 in head 156. Lubrication is introduced into the cutter head through tube 223 in arm 157 and exits through sleeve 224 of flexible shaft 225.

Each peeling head is drive by a small flexible shaft 226 which derives its power from an elongated gear box 227 having provision for attachment of three shafts. Power is supplied to gear 228 of gear box 227 from motor 229 through belt and pulley drive 231. The flexible shafts 225 permit the peeling heads to swing out for the various fruit diameters and to swivel to a limited degree for fruit shape variations.

Figure 26:
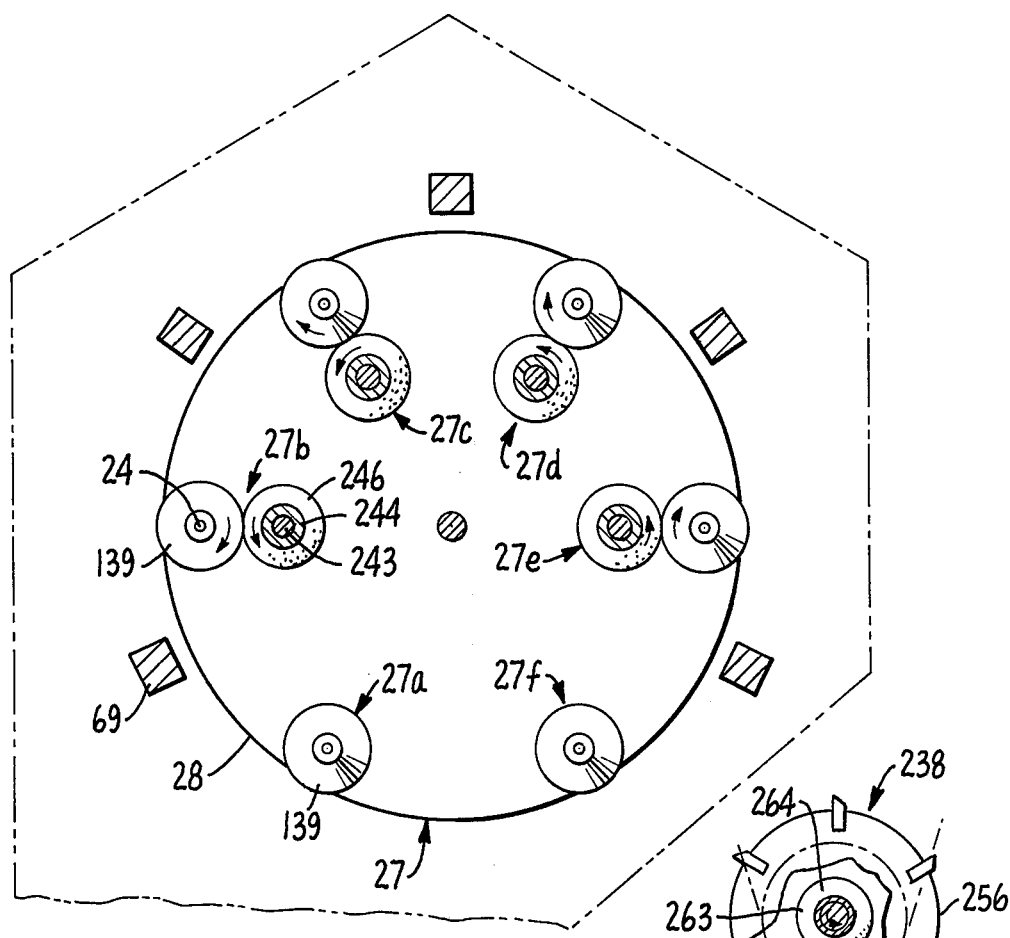
FIG. 26 is a section taken along the line 26—26 of FIG. 13.
Figure 27:
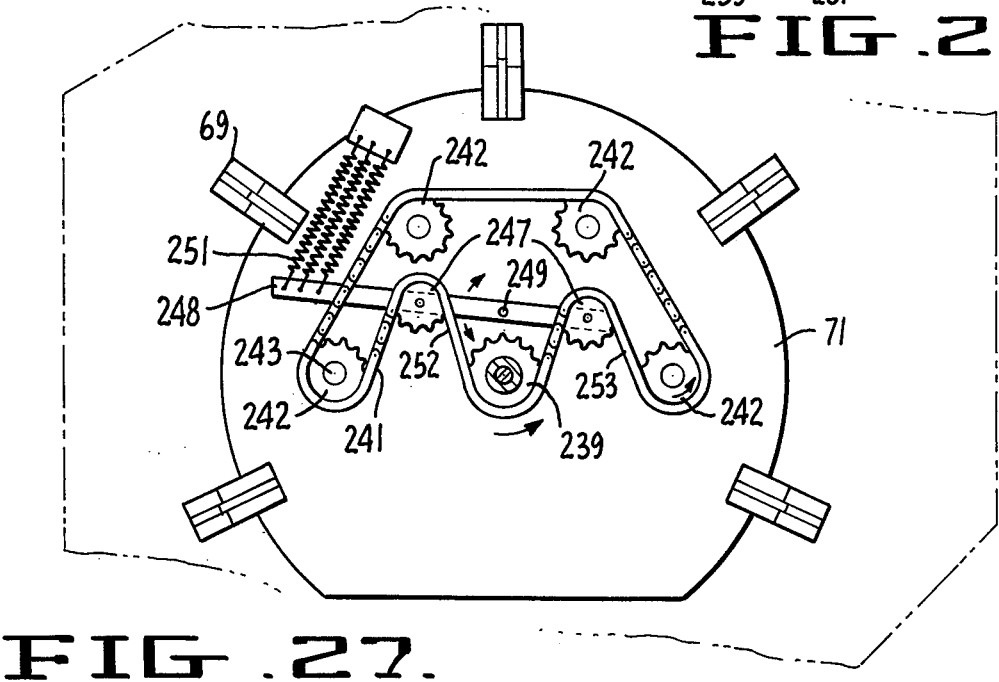
FIG. 27 is a section taken along the line 27—27 of FIG. 13.

The mechanism for driving the peeling spindles 24 consists of a motor 236 and speed reducer 237 with a single revolution clutch 264 on its output (FIGS. 5 and 13). The output of single revolution clutch 264 has a sprocket 239 driving a snake drive chain 241. Chain 241 meshes with sprockets 242 of four drive spindles 243 (FIGS. 26, 27 and 13). Spindles 243 are supported on top plate 71 in hubs 244 and carry rubber friction wheels 246 at each of the four peeling stations. Interposed in the tight and loose sides of the chain are idler sprockets 247 mounted on a teeter-totter lever 248. Sprockets 247 are in such a position that they form two "U's" in the chain between drive sprocket 239 and sprockets 242. Lever 248 is centrally pivoted at 249 and is pulled by springs 251 to elongate the "U" in the tight side 252 and at the same time reduce the "U" in the loose side 253 of the chain. When the single revolution clutch 264 is engaged, it imposes a sudden acceleration in the drive chain 241 which would be transmitted to the pineapple by the fins on the peeling spindle. Such a sudden acceleration would tend to ream the core out of the pineapple and cause the spindle to lose effective engagement with the pineapple. By interposing the spring cushioned sprocket mechanism, the sudden starting torque is changed to an increasing torque by stretching of the springs on the teeter-totter lever 248. When the clutch shuts off, the momentum of the system causes it to coast to a stop rather than come to a sudden stop while springs 251 return to their unstretched position.

Each peeling spindle 24 carries a friction wheel 139 which engages successively each of the four rubber friction wheels 246. Since there are only four wheels 246, one at each peeling station, only the four spindles 24 at the peeling stations rotate. The sprocket ratio between one revolution clutch 264 and spindles 243 is about 10-9 so that spindles 24 rotate more than a full turn. When the fruit reaches its position at the peeling station, it makes one revolution plus 5 to 10% to ensure a full overlap of the start and finish of the cuts. The reason for this extra part of a turn is that the cutter enters the fruit acting like a disc which passes the fruit centerline. The cutter teeth 212 which move ¼ inch to ⅜ inch past the fruit centerline are actually lower than the tangent height by the height of the chord with a half length of ¼ inch to ⅜ inch. This is about 1/32 inch and the teeth in passing cut a flat on the fruit. The fruit is predominately curved in axial cross section and this is a small defect which is unavoidable with this cutter system. Rather than turning the pineapple one turn and allowing the first and second cutters to make a double depth flat, the fruit is rotated a little more to put two smaller, separate flats on each cutter band. The two flats are almost unnoticeable and are less wasteful than two flats compounded.

Figure 28:
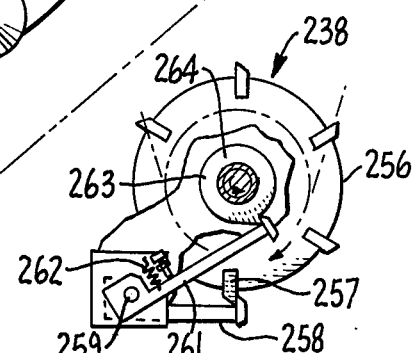
FIG. 28 is a section taken along the line 28—28 of FIG. 13.

One revolution clutch 264 is tripped at the end of the indexing cycle by the structure 238 shown in FIGS. 13 and 28. Peeling turret disc 28 carries a cam disc 256 having cams 257 corresponding to the six indexing positions or stations. Cam shoe 258 has a hooked end adjacent to the periphery of disc 256 which is biased into engagement with cams 257. The other end of cam shoe 258 is connected by shaft 259 with upper pawl arm 261. Upper pawl arm 261 is biased by spring 262 to engage toothed disc 263 and prevent rotation of clutch output sprocket 239. At the completion of indexing movement of turret 28, the hooked end of cam shoe 258 is momentarily swung outwardly the front face of the next succeeding cam 257. This rotates shaft 259 and swings upper pawl arm 261 away from toothed disc 263 and allows sprocket 239 to rotate. Immediately thereafter, cam shoe 258 falls onto the back side of cam 257, in the catch position, at the end of the indexing cycle and allows upper pawl 261 to move inward toward toothed disc 263 and interrupt rotation of sprocket 239 after one revolution. Thus, at the end of each indexing cycle, cam shoe 258 and pawl arm 261 rotate with shaft 259 outwardly and allow toothed disc 263 and clutch to rotate one revolution. To accomplish the more than one revolution of peeling spindle 24, the diameter of sprocket 239 is slightly larger than sprockets 242 of drive spindle 243.

Figures 29, 30:
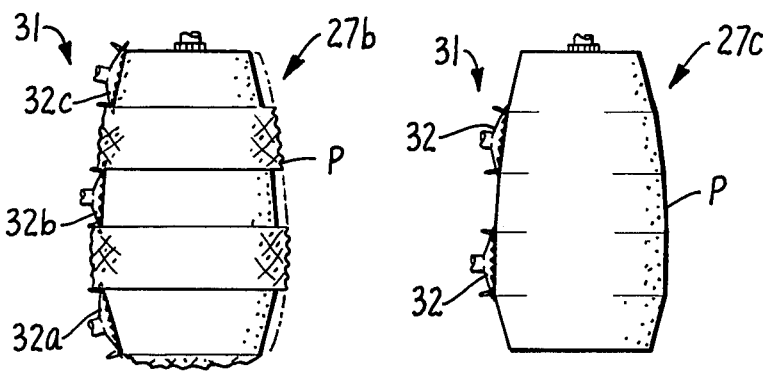
FIGS. 29 through 34 are views illustrating the first stage peeling of various sizes of pineapple.
Figures 31, 32:
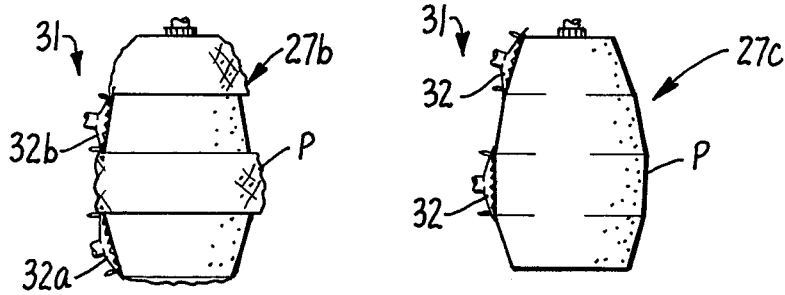
Figures 33, 34:
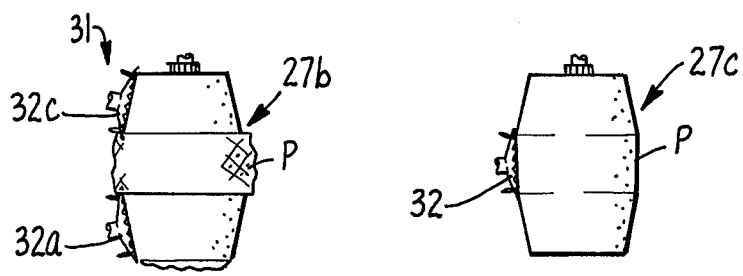

As mentioned, the machine may be set up to accommodate various size ranges of pineapple. FIGS. 29-34 illustrate the setups of the cutter arrays 31 as they would be arranged for peeling the alternate bands for different size fruit. FIGS. 29 and 30 illustrate a 3-2 cutter arrangement for peeling a large size pineapple at the first and second peeling stations. FIGS. 31 and 32 illustrate a 2-2 cutter arrangement for medium sized fruit and FIGS. 33 and 34 illustrate a 2-1 arrangement for small fruit. Of course small fruit may be run on the 3-2 setup but the upper heads would not contact the fruit. There are other reasons which make it undesirable to mix the sizes of fruit.

Figures 35, 36:
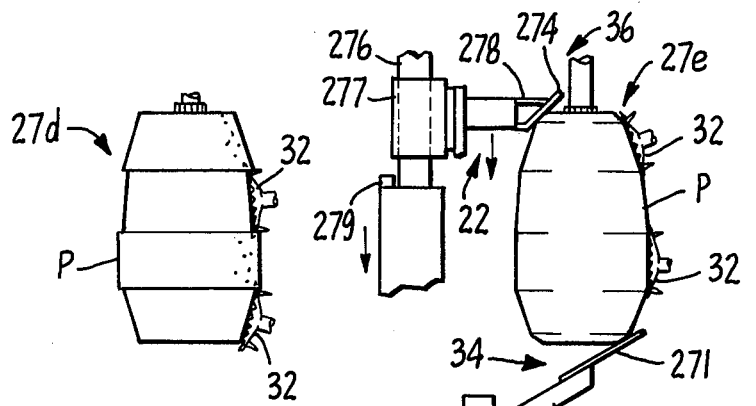
FIGS. 35 and 36 are views illustrating the second stage peeling of a medium pineapple, FIG. 36 particularly showing the trimming of the bottom and top corners of the fruit.

FIGS. 35 and 36 illustrate the arrangement of the cutters at the third and fourth peeling stations as set up for a medium size pineapple. Of course they can be set up for the large and small size pineapples in a manner similar to the first and second stations. At the third and fourth or final peeling stations 27d and 27e, the pineapple is peeled to a depth to remove all of the remaining eyes. At the station 27e the juncture between the flat bottom and ovoid side of the pineapple is trimmed by a pre-set bottom trim knife assembly 34. The knife has a blade 271 sharpened on its leading edge and carried on arm 272. Arm 272 may be adjusted along bracket 273 as to angle and height to conform with the fruit bottom as predetermined by bottom cutoff knife 29.

The juncture between the ovoid side and flat top of the pineapple is trimmed by movable top trim knife assembly 36 (FIGS. 54–56). Knife blade 274 is slidably carried on vertical rod 276 by slide block 277. Block 277 also carries a gauge shoe 278 which is brought to rest on the incoming pineapple. Elevator slide 279 is positioned below slide block 277 and is formed to elevate block 277 and gauge shoe 278 prior to the pineapple arriving at the fourth peeling station. As the pineapple is indexed into the final peeling station, elevator slide 279 lowers, allowing slide block 277 to move down along rod 276 until gauge shoe 278 contacts the top of the pineapple where further downward movement of top trim knife assembly 36 is arrested. Top trim knife blade 274 is now in position to trim any remaining eyes from the top edge of the pineapple. Knife blade 274 is sharpened on both edges to cut into the incoming pineapple and on its opposite edge to trim the pineapple when it is rotated by spindle 24. A latch mechanism 281 may be incorporated with gauge shoe 278 as will be described hereinafter.

After peeling and trimming, the pineapple has an ovoid shape as it is indexed to the final peeling turret station 27f. It may be discharged from the machine as an ovoid to be inspected and recored before making into chunks or a cylinder for making slices or it may be made directly into a recored cylinder and crush blanket.

At the final peeling turret station 27f, the peeling spindle is aligned over a rotating knife 43 having a sharpened edge on a replaceable ring 284 at its upper end and being relieved to a greater inside diameter 286 below the ring (FIGS. 1, 3, 5, 37 and 38).

A transfer finger 42 similar to transfer finger 26 is carried on a shaft 287 which is similarly formed to swing the finger 42 to a position about spindle 24 and also movable axially to push the pineapple downwardly off of the peeling spindle and onto the edge of knife 43. As the pineapple is sliced by knife 43, the part inside the diameter of sharpened ring 284 will be in the form of a cylinder and the portion outside this diameter will engage upstanding knife blade 288 and will be slit along its vertical axis. Subjacent to upstanding blade 288 is a helicoid shaped chute 289 which spreads the outside portion of pineapple into a flattened configuration preferably with what was the ovoid outer surface layer uppermost for easier final inspection.

Figure 2:
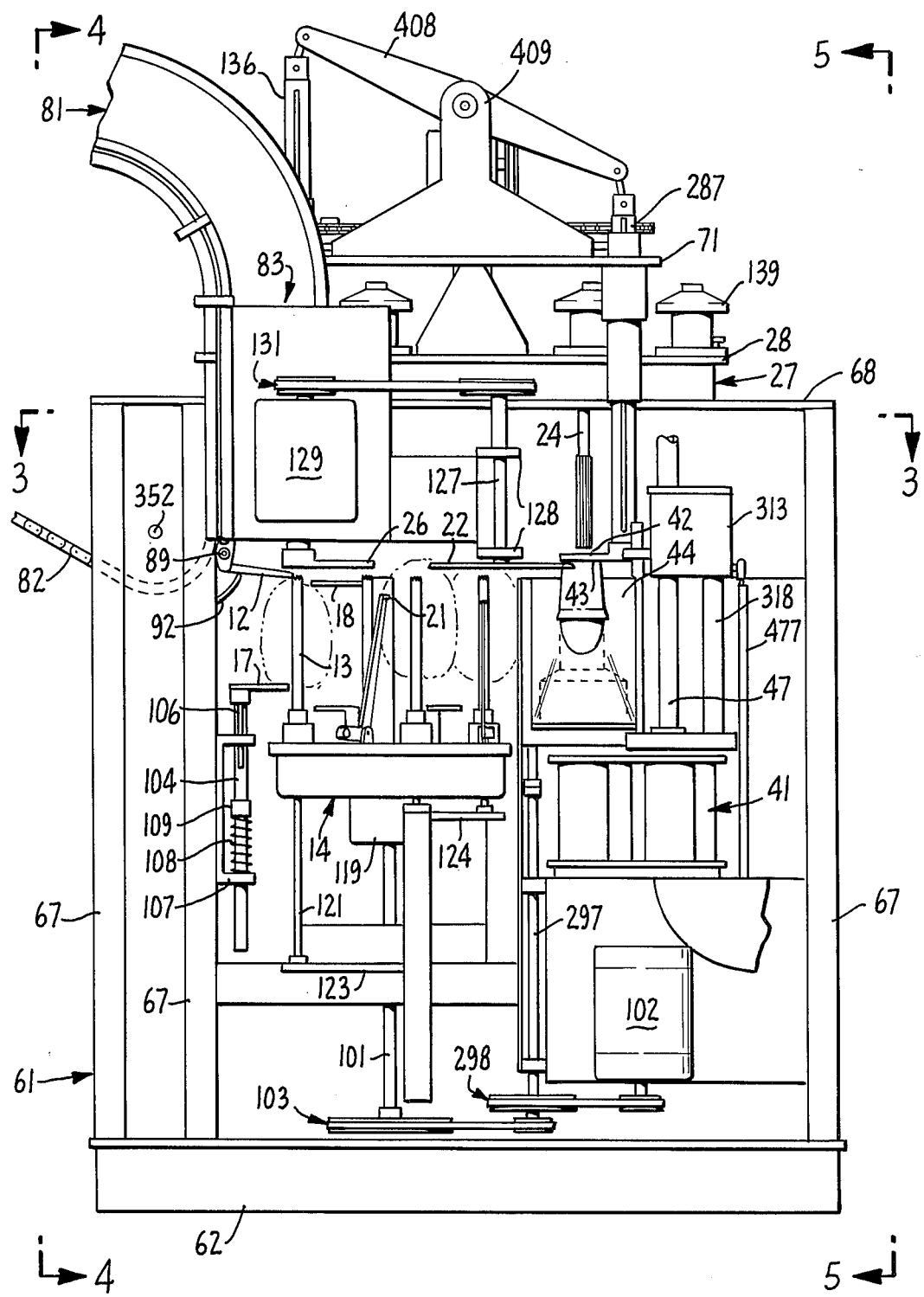
FIG. 2 is a front elevation of the machine.

Knife 43 is longer than any anticipated pineapple so that the cylindrical length of pineapple may be entirely supported therein until the pineapple is finally severed. Transfer pusher finger 42 has a downwardly extending boss 291 on its underside which pushes the last remaining top end of the pineapple into knife blade 284. Knife 43 is rotatably journaled on spaced bearings 292 in stationary housing 293 and is driven through gear 294 and gear 296 by shaft 297. Shaft 297 is driven by belt and pulley drive 298 from motor 102 as shown in FIG. 2.

When the pineapple is fully cut into a cylinder and crush blanket, the cylinder will fall entirely through knife 43 into a waiting pocket 46 of final recoring turret 41 while the crush blanket PB slides down chute 44 for further inspection and processing.

The final coring turret 41 is formed by four equidistantly spaced tubes 301 connected between upper and lower circular plates 302 and 303. The plages are supported on hub 304 on shaft 306 and are rotatable thereon by indexing drive mechanism 307.

Below lower plate 303, the pineapple is supported in pockets 46 by platform 308 and slide plate 309. Platform 308 is immediately below the knife station and is supported at the upper end of a shock absorbing cylinder 311 which absorbs the falling force of the falling cylinder of pineapple while ensuring that the pineapple is re-elevated to a position in pocket 46.

With the pineapple cylinder in pocket 46, turret 41 is indexed with the same index and dwell periods as the peeling turret, but it is timed differently. The drill and peeling turrets must be identically timed because the pineapple is transferred from one to the other. The recoring turret finishes its index about as the peeling turret starts to index. When the pineapple is finally pushed off the peeling spindle, the spindle can begin to index. The length of rotary knife 43 is a bit longer than the longest pineapple, and pocket 46 in the recoring turret 41 which is to receive the cylinder should arrive in position shortly before the cylinder PC arrives so that the dwell time is available for the cylinder to reach bottom and be cushioned by cylinder 311 which must return to its upper position before turret 41 begins to index so that the pineapple can slide along support plate 309 as the turret indexes. The cylindrical pocket 46 is a close fit on the pineapple cylinder PC and holds the pineapple core centrally.

The final coring of the pineapple is performed after the first index of recoring turret 41 at a recoring station 41b. Hollow recoring tube 47 is slidably carried over station 41b on slide 313. The lower end of tube 47 is aligned in bushing 314 and further has a sharpened edge which penetrates the pineapple to sever the remaining fibrous core from the cylindrical fruit meat. A hole 316 is provided in slide plate 309 so coring tube 47 may be fully thrust through the pineapple cylinder. Bushing 314 is aligned over the axis of pocket 46 of second station 41b on plate 317. Plate 317 is clamped on an extension of turret shaft 306 and also supports vertical guide rod 318 of slide 313. The cores removed by core tube 47 are either ejected out of an upper extension 320 of core tube 47 into a chute or may be ejected downwardly by a suitable core ejector rod and air cylinder arrangement as desired (not shown).

After the second index of turret 41, the finished pineapple cylinder is brought over a discharge chute 321 at station 41c. Here the fruit will fall by gravity off the end of slide plate 309 or is pushed out of pocket 46 by pusher 48. Pusher 48 is carried on arm 322 extending from recoring slide 313 and aligned over the third off loading station 41c by the extension of turret shaft 306. Depressing slide 313 will both recore the fruit at the second station 41b and eject the fruit at third station 41c.

The drives for performing the various described functions are shown in FIGS. 41–58. These drives are for the infeed conveyor 81, indexing mechanism 119 for infeed turret 14, indexing mechanism 66 for peeling turret 27, and indexing mechanism 307 for final recoring turret 41. The drives for the primary core removal mechanism 328, height setting up-down mechanism 326, swing mechanism 327, transfer-swing mechanism 329, transfer slide mechanism 331, top trim knife elevator mechanism 332 and final core and eject mechanism 333 are all individually cam actuated as shown in FIGS.

43-59. These cams are mounted on main cam shaft 336 and upper cam shaft 337 which are journaled for rotation on central column 63. Prime mover 338 drives the infeed conveyor, each of the indexing mechanisms and cam shaft 336 and cam shaft 337 through an integrated drive system such that the aforementioned functions are carried out in a timed sequence.

Prime mover 338 rotates shaft 339 through pulley 341, belt 342 and pulley 343. Intermediate drive shaft 344 is driven through gear train 346 by shaft 339. Intermediate drive shaft 344 drives infeed conveyor 81 through chain and sprocket drive 347, right angle drive 348 and chain and sprocket drive 351 to conveyor sprocket shaft 352. Intermediate shaft 344 drives main cam shaft 336 through gear train 353 and upper cam shaft 337 through chain and sprocket drive 354. Infeed turret indexing mechanism 119, peeling turret indexing mechanism 66 and recoring turret indexing mechanism 307 are respectively driven by chain and sprocket drives 356, 143 and 358 from main cam shaft 336.

Figure 43:
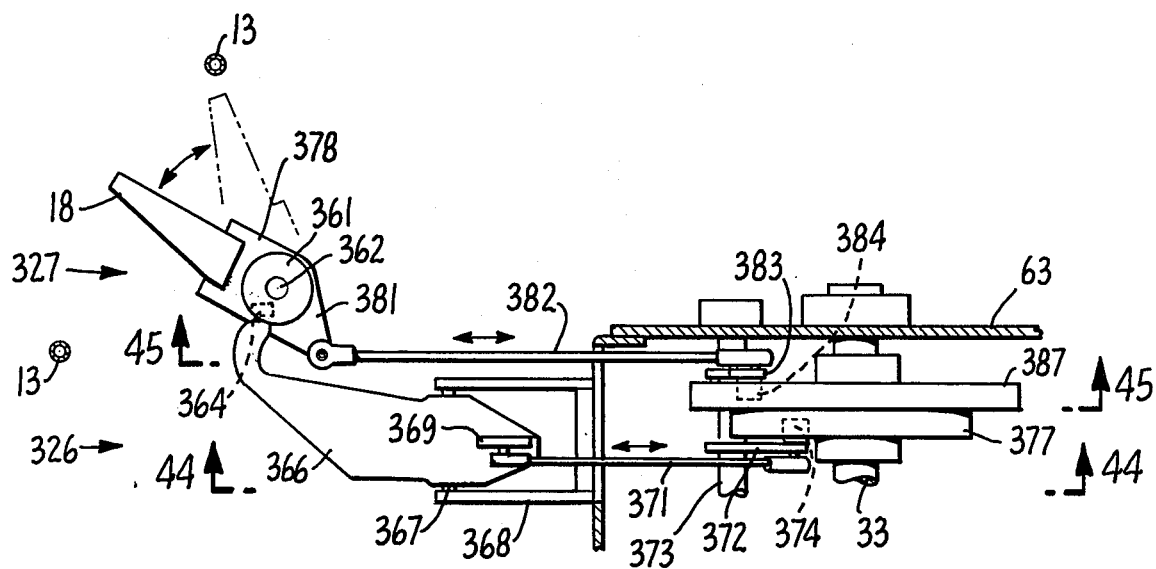
FIG. 43 is a fragmentary plan view of the pineapple height setting mechanism and drive therefor.
Figures 44, 46:
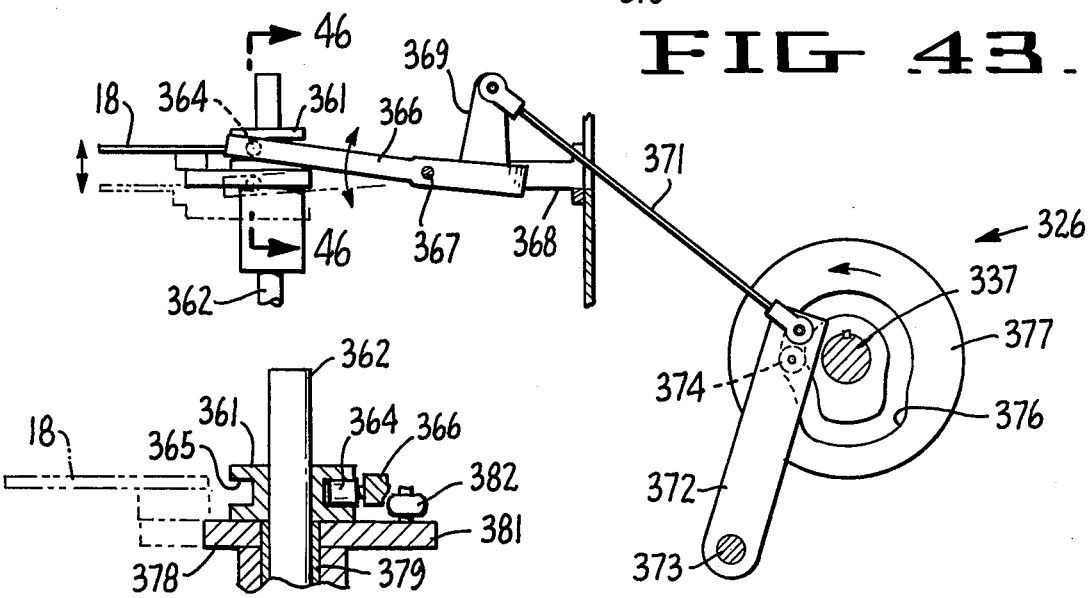
FIG. 44 is an elevational section taken along the line 44—44 of FIG. 43 showing the drive for the height setting up-down mechanism.
FIG. 46 is a section taken along the line 46—46 of FIG. 44.
Figure 45:
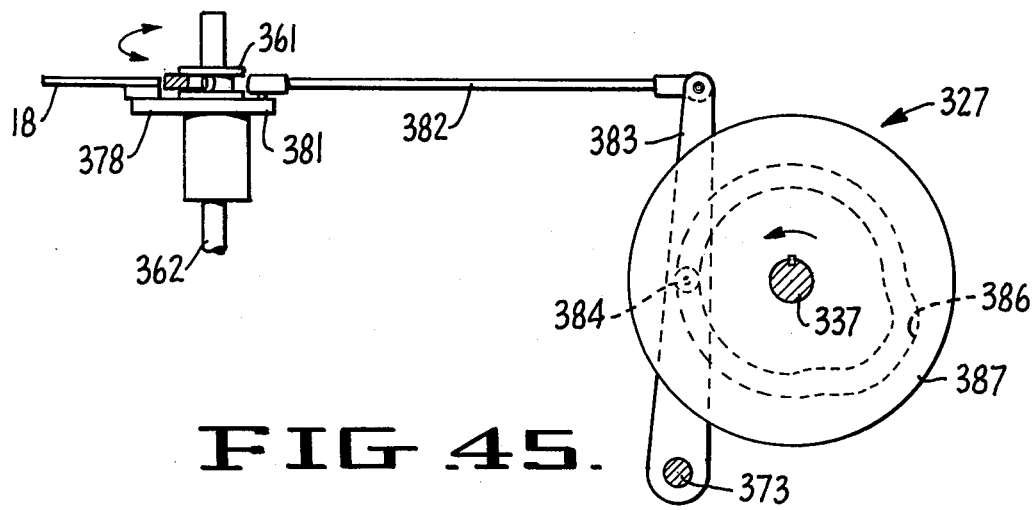
FIG. 45 is an elevational section taken along the line 45—45 in FIG. 43 and showing the drive for the height setting swing mechanism.

In the specific cam drives for the various functions, FIGS. 43-45 illustrate the cam drive for the height setting up-down mechanism 326. Height setting finger 18 is carried on platform 378 for sliding movement on vertical shaft 362. Collar 361 is attached to platform 378 and has a circumferential slot 365 receiving roller 364 of hinged arm 366. Hinge arm 366 is pivoted at 367 on frame 368 and arm 366 also has an upstanding arm 369 connected to link 371. The opposite end of link 371 is connected to rocker arm 372 and is reciprocated thereby when arm 372 is rocked about shaft 373 by cam follower 374 riding in cam track 376 of "height setting up and down" cam 377.

Height setting swing mechanism 327 is illustrated in FIGS. 43 and 45. The finger collar 361 is attached to platform 378 which supports finger 18 and is swingable about vertical shaft 362 on bushing 379. Platform extension 381 is pivoted to link 382 and reciprocated by arm 383 to cause platform 378 and finger 18 to swing from the full line position of FIG. 43 to the phantom line position. Arm 383 is rocked about shaft 373 by cam follower 384 riding in cam track 386 of "height setting swing" cam 387. "Height setting up and down" cam 377 and the "height setting swing" cam 387 are keyed to upper cam shaft 337.

Figure 47:
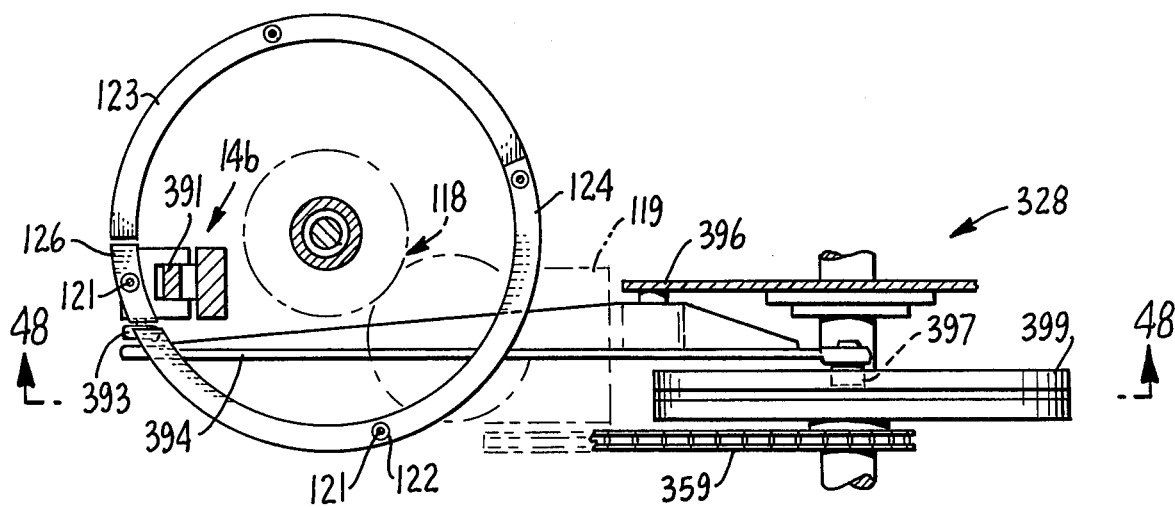
FIG. 47 is a fragmentary plan view of the core ejection mechanism at the drill station.
Figure 48:
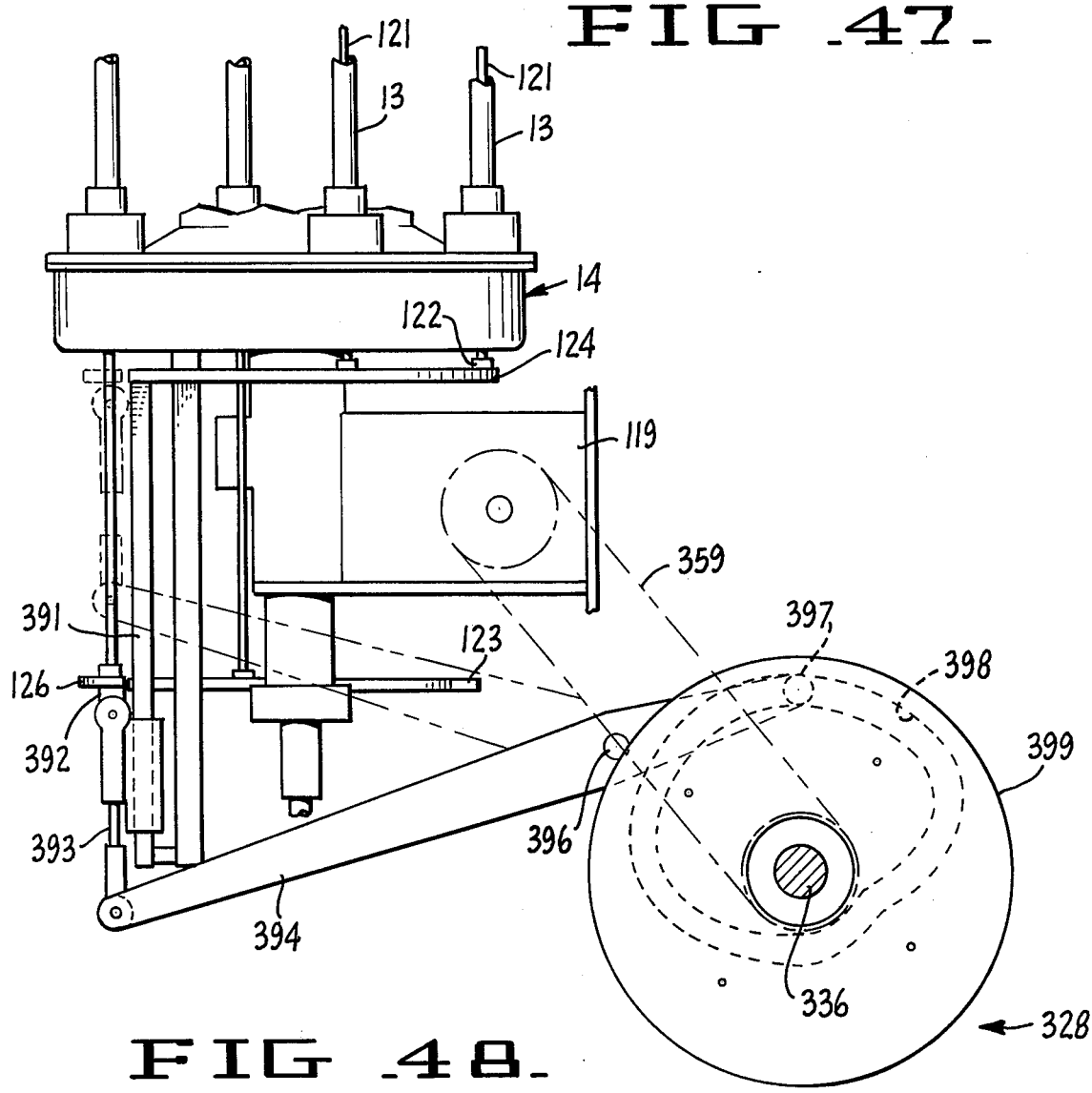
FIG. 48 is a fragmentary elevational view of the device in FIG. 47 and taken along line 48—48 thereof.

The primary core push out mechanism 328 at infeed turret 14 is illustrated in FIGS. 47 and 48. It will be recalled that the core ejector rods 121 are slidably supported at their lower ends on rails 123 and 124. Rail segment 126 at core ejection station 14b is elevated to push the rod upward through the core drill spindle 13 and thus eject the core out of the upper end of the drill spindle. Rail segment 126 is supported on vertical guide 391 by structure 392. Link 393 is pivoted to structure 392 and arm 394. Arm 394 is pivoted about centrally located shaft 396 by cam follower 397 riding in cam track 398 of "core push out" cam 399. Cam 399 is keyed on cam shaft 336. Also illustrated in FIGS. 47 and 48 is the chain and sprocket drive 359 between main cam shaft 336 and infeed turret indexing mechanism 119.

The transfer sequence of transferring the pineapple from infeed drill spindle 13 to peeling spindle 24 and transfer sequence of transferring the peeled pineapple from peeling spindle 24 through knife 43 and into recoring turret 41 are timed to occur during the dwell period of the indexing mechanisms. Since the transfer sequences are performed within the same time frame, the transfer mechanism may conveniently be interconnected as is shown in FIS. 49 and 50.

Transfer finger 26, which shuttles between drill spindle 13 and peeling spindle 24, is carried by collar 401 on shaft 136. Shaft 136 is movable axially in bushing 402 and is keyed thereto by key 403 in elongated keyway slot 404. Bushing 402 is rotatable journaled in bushing holder 406 carried on top plate 71. The upper end of shaft 136 is connected through swivel connection 407 to one end of rocker arm 408. Arm 408 is pivoted at its midpoint on upstanding yoke 409 for movement between the solid line position of FIG. 49 and the phantom line position.

Figure 50:
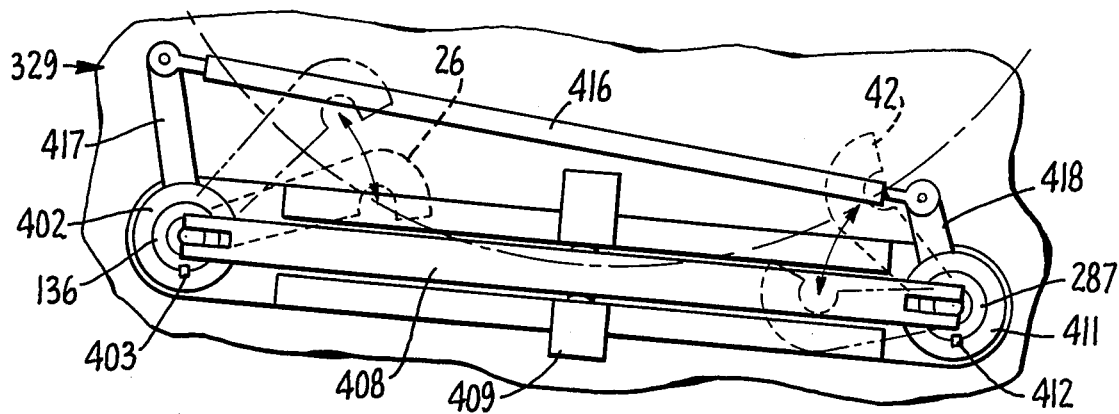
FIG. 50 is a fragmentary plan view taken along the line 50—50 of FIG. 49.

Transfer finger 42 shuttles between peeling spindle 24 and rotary knife 43 and is similarly mounted for axial and rotary movement. Finger 42 is attached to the lower end of shaft 287 which in turn is keyed for axial movement in bushing 411 through keyway slot 412. Bushing 411 is rotatably journaled in holder 413 on top plate 71 while the upper end of shaft 287 is connected to the opposite end of rocker arm 408 by swivel connection 414. Bushings 402 and 411 are rotatably interconnected by link 416 joining bushing arm 417 and bushing arm 418. As seen in FIG. 50, the fingers are swung in unison from the dotted line position, adjacent their respective spindles and ready for transfer, and alternately to a phantom line position away from the spindles so that they clear the next incoming pineapple while retracting.

Figure 49:
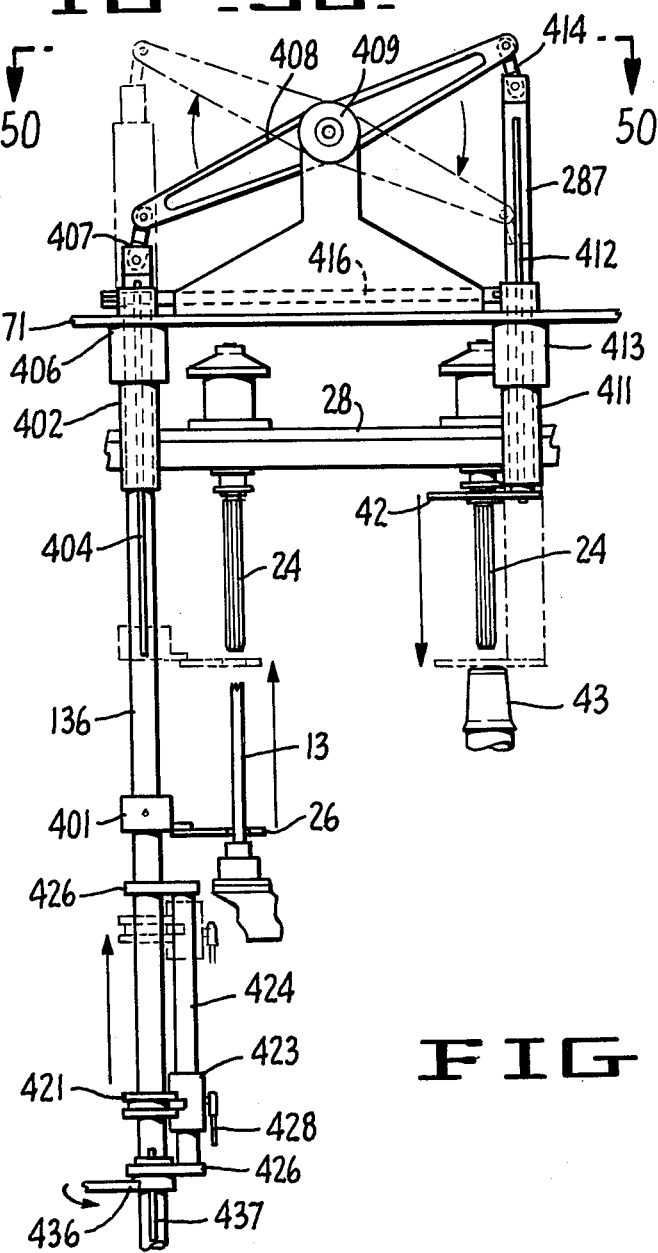
FIG. 49 is a fragmentary elevational view of the pineapple transfer mechanism and showing the interconnection between the elevating and push off mechanisms.

The transfer slide mechanism 331 is best shown in FIGS. 49, 51 and 53. Transfer shaft 136 is elevated by collar 421 carried near the lower end thereof. Collar 421 has an annular slot which receives projecting finger 422 from elevating sleeve 423. Sleeve 423 is journaled for vertical movement on post 424. Post 424 is supported in parallel relation with shaft 136 by spaced frame members 426. Sleeve 423 is elevated by arm 427 through link 428 when arm 427 is rocked about shaft 429. Arm 427 has slider guideway 431 receiving slider 432 from crank arm 433. Crank arm 433 is keyed to main cam shaft 336 through counterweighted disc portion 434. Transfer slide mechanism 331 elevates and lowers pusher fingers 26 and 42 in a phased relation as denoted by "push onto peeling spindle" and "push off peeling spindle" timing bars in the timing chart of FIG. 59.

The transfer swing mechanism 329 is shown in FIGS. 49-52. Transfer shaft 136 is swung about its vertical axis by rotation of collar 436. Shaft 136 has an elongated longitudinal key 437 which is received by a key slot in the interior bore of collar 436. Collar 436 is journaled for rotary motion in frame member 426 and has arm 438 extending radially therefrom. Arm 438 is joined by link 439 to arm 440 carried on shaft 441. Shaft 441 is pivoted in frame 442 attached to center column 63 and supports arm 444 connected by link 446 to lever 447. Lever 447 is rocked about shaft 448 by cam follower 449 riding in cam track 451 of "pusher swing" cam 452. Cam 452 is keyed to main cam shaft 336.

As mentioned, the top trim knife 36 is supported to trim the remaining eyes from the juncture between the ovoid sides and the flat top of the pineapple. Since the height of the pineapple may vary with the size range of pineapples processed, the top trim knife is movable vertically to intercept properly this juncture. As shown in FIGS. 54-56, a top trim knife mechanism 332 is provided which will hold the top trim knife above an incoming pineapple while a gauge shoe 278 locates the top of the pineapple. The top trim knife sliding block 277 is lowered toward the pineapple until it is stopped by a latch mechanism 281 responsive to the vertical position of gauge shoe 278.

Top trim knife blade 274 is a double sharpened blade bent at the proper angle and projecting from sliding block 277. Block 277 is in the form of a box-shaped sleeve slidably on vertical bar 276 and biased downwardly thereon by spring 456. Subjacent box-shaped sleeve 277, elevator slide 279, is vertically movable to engage the bottom of sleeve 277 and elevate top trim knife blade 274 to a position above the incoming pineapples and alternately movable downward to allow sleeve 277 to be lowered by spring 456. Elevator slide 279 is slidably supported on a lower extension of rod 276 and is moved vertically thereon by link 457. Link 457 is attached to the outer end of arm 458. The inner end of arm 458 is supported on shaft 459 which also carries lever arm 461. Arm 461 rocks shaft 459 as cam follower 462 rides in cam track 463 of "top trim knife" cam 464. Cam 464 is keyed to upper cam shaft 337.

Latch mechanism 281 includes latch pawl 466 supported by sleeve 277 adjacent rack teeth 467 of bar 276 by shaft 468. Lever arm 469 is also carried on shaft 468 and is biased by spring 471 to rotate shaft 468 and swing latch pawl 466 out of engagement with rack teeth 467. Gauge shoe 278 extends in the direction of the incoming pineapples and is supported for swinging movement on an extension of sleeve 277 by pin 472. The inner end of gauge shoe 278 has upstanding member 473 engageable with adjusting screw 474 of lever 469. As sliding block 277 is allowed to be lowered toward the incoming pineapple, gauge shoe 278 will contact the top of the pineapple and be rotated about pin 472 causing member 473 to engage screw 474. Lever 469 is then swung thereby to rock shaft 468 and position latch pawl 466 in the confronting rack tooth 467. This will halt any further downward motion of sliding block 277 and will properly position trip trim knife blade 274 to cut the aforementioned juncture.

Figure 40:
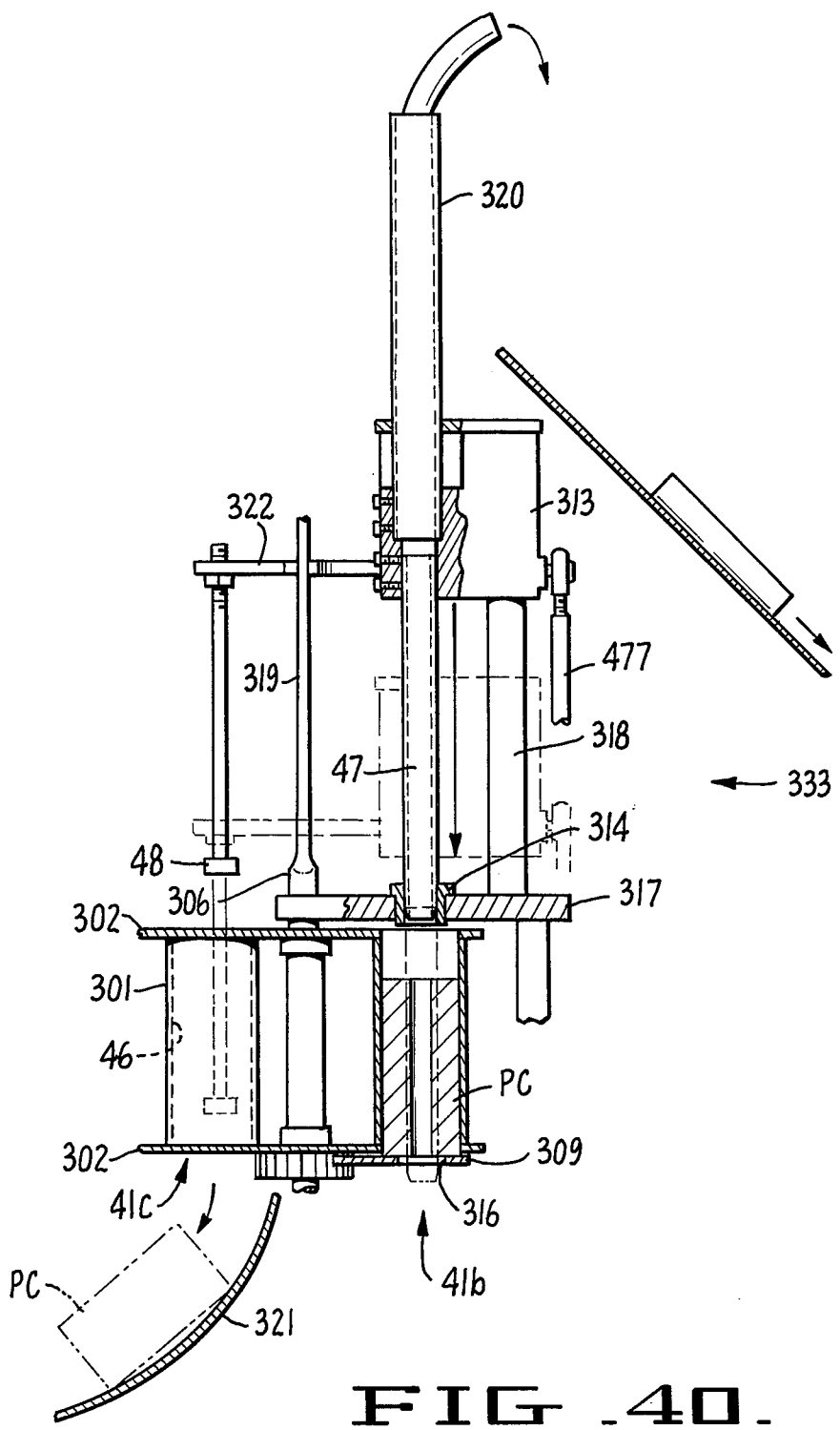
FIG. 40 is an elevational view taken along the line 40—40 of FIG. 39, illustrating the final coring and final ejection of the pineapple.
Figure 42:
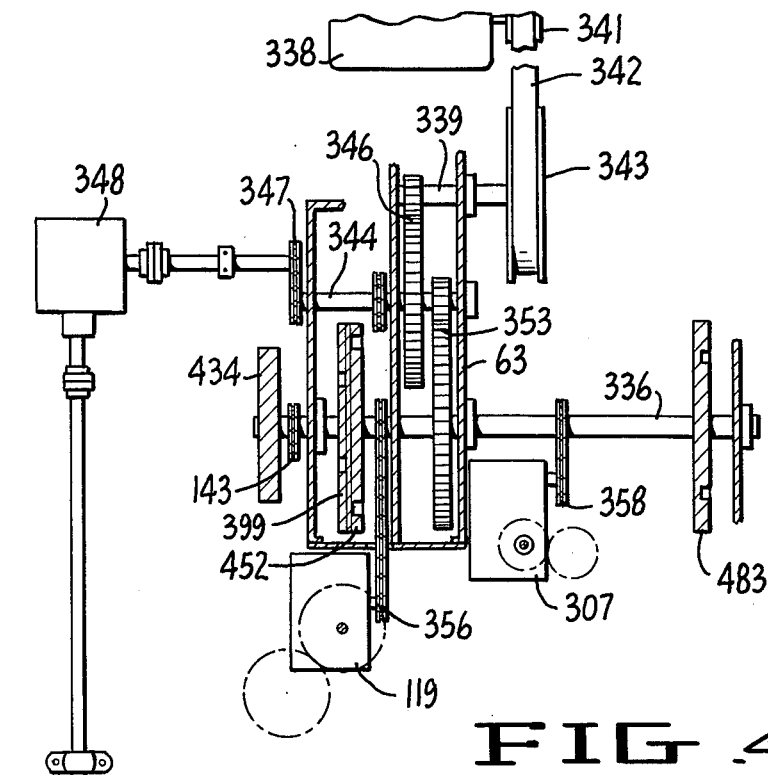
FIG. 42 is a diagrammatic plan view taken substantially along the plane of line 42—42 of FIG. 41.
Figure 41:
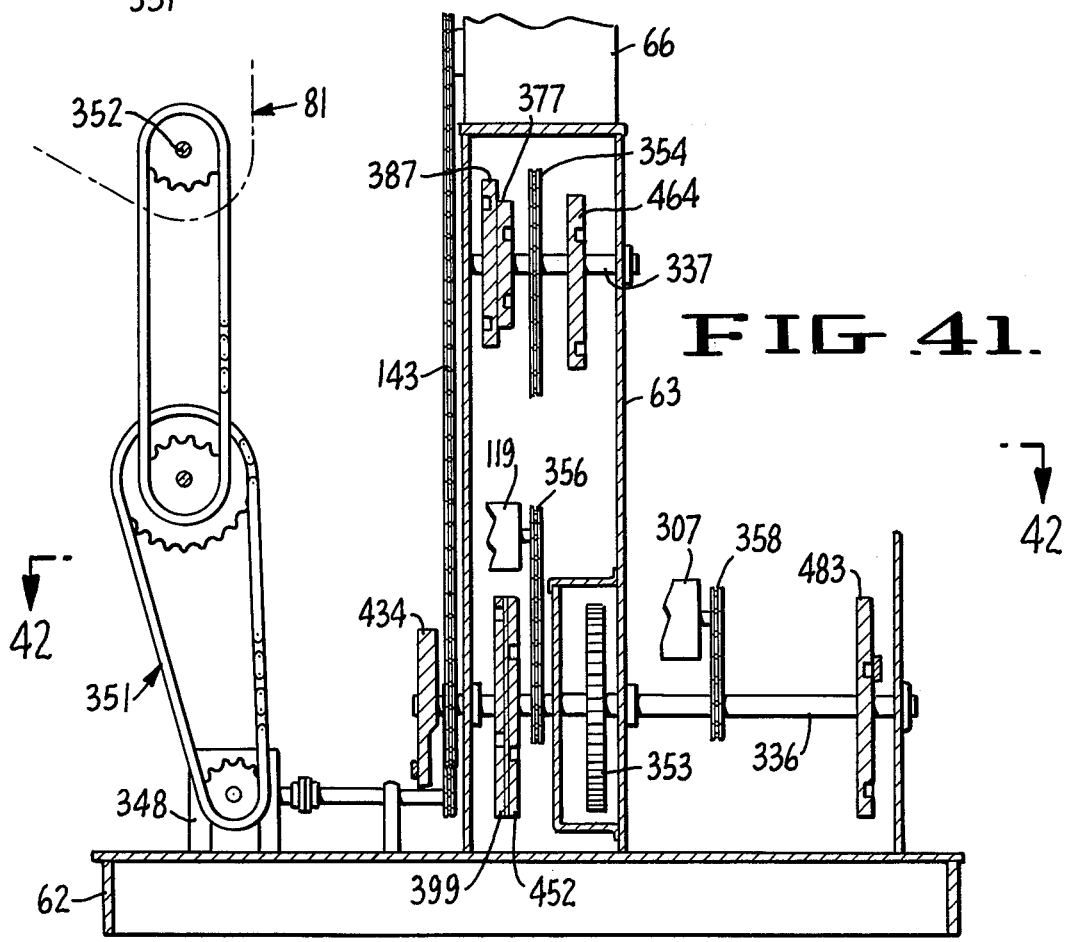
FIG. 41 is a diagrammatic elevational view of the drives, cams and cam shafts for performing the various functions of the pineapple machine.

The final function to be performed is to cut a full size core hole in the pineapple and also eject the pineapple from the pocket of turret 41. This is accomplished with a core and eject mechanism 333 as shown in FIGS. 40 and 57-58. Slide 313 supports both the final coring tube 47 and ejector pad 48 and is slidably supported on vertical guide post 318. Slide 313 is attached at one end to link 477 which is in turn pinned at its other end to the outer end of rocker arm 478. Rocker arm 478 is supported on shaft 479 and elevates link 477 as cam follower 481 rides in cam track 482 of "final core" cam 483. Cam 483 is keyed to main cam shaft 336.

In operation, the machine is adjustable to provide optimum processing of the particular size range of pineapples to be processed. The arrangement of the cutter array is chosen as shown in FIGS. 29-34. The depth of peel removed is adjusted by moving gauge shoe 152 of the cutter assembly 151 by advancing or retracting jack screws 191 (FIGS. 16-19 and 24). This adjustment is only necessary on the first and third cutter arrays to set the depth of peel, the depth of the second and fourth peeling arrays being such as to blend the cuts made by the first and third cutter arrays. The only other adjustments necessary are to replace the rotary knife holder sleeve 286, the bore of the rotary knife 284 and turret sleeves 301 with suitable sleeves to suit the pineapple size and the final coring tube 47 with replacements of a greater or smaller diameter.

Pineapples of the chosen size range are loaded at a loading station (not shown) on a horizontal run of infeed conveyor 81 between the spaced feed lugs 12. Motors 129, 229, 236 and 102 are started for driving the top cutoff knife 22, peeling cutters 32, peeling spindles 24, drill spindles 13, and rotary knife 43. Starting prime mover 338 starts the cycle by advancing feed lugs 12 toward centering device 83. Here the pineapples are centered about a vertical axis and maintain this condition as the feed lugs push them onto the rotating core drills 13. A central hole is drilled in the fibrous core material and feed lug advances to ensure that the hole goes entirely through the pineapple. Core drill 13 exerts a minimum axial thrust on the infed pineapple which extends the life of the sliding surfaces of lugs 12.

The lower end of the pineapple contacts spring supported platform 17 and compresses spring 108. As feed lug slide 85 leaves track 91, spring platform 17 raises the drilled pineapple on core drill 13 until it contacts height setting finger 18 which has just arrived over the spindle and moved down to the prescribed height (FIGS. 6-11). With the pineapple held between platform 17 and finger 18, turret 14 is indexed to move the pineapple to the next station. Part way through the indexing cycle flat blade 21 is jabbed into the side of the pineapple to maintain the top end of the pineapple above the core drill 13. At station 14b, the core is ejected from core drill 13 by core push out rod 121 and the top of the pineapple starts to contact top cutoff blade 22. During the next index, blade 22 completely severs the upper end of the fruit. Druing the next index, flat blade 21 is retracted and the pineapple drops onto springs 23 prior to being transferred at station 14d.

During the dwell period of indexing mechanism 119, pusher finger 26 swings toward core drill 13 beyond cushion springs 23 and moves upward with shaft 136. This transfers the pineapple onto peeling spindle 24 of peeling turret 27 during the dwell period of indexing mechanisms 66 and 119.

Upon indexing peeling turret 27, the pineapple is brought into a first peeling station 27b (FIG. 17). As the pineapple approaches this station, gauge shoes 152 contact the outer surface of the pineapple and pivot and swing cutter head assemblies 151 about pins 153 and shaft 154 to align cutter blades 32 with the pineapple surface. The cutters are rotating and start to peel as the one revolution clutch is tripped to rotate peeling spindle 24 through snake drive chain 241 (FIG. 27). As spaced bands are peeled around the pineapple, the lower end of the fruit is partially sliced by bottom cutoff knife 29. During the next index of peeling turret 27, knife 29 finishes severing the bottom. Also, the peelings are swept off cutter heads 156 by wiper blades 197.

Similar peeling is performed at the subsequent peeling stations 27c, 27d and 27e. At the final peeling station 27e, the top edges of the pineapple are also trimmed by bottom trim knife 34 and top trim knife 36. Turret 27 is indexed to the final station 27f where pusher 42 swings inward toward the peeling spindle above the pineapple and is transferred by shaft 287 to push the pineapple through rotating rotary knife 43. Here the pineapple is cut into a cylinder PC while the outer layer is slit by knife 288 into crush blanket PB (FIGS. 37 and 38). The pineapple cylinder falls into pocket 46 of turret 41 while crush blanket PB slides down chute 44.

Turret 41 is indexed to bring pocket 46 beneath recoring tube 47. Tube 47 is plunged into the center of the pineapple to remove the remaining fibrous core. Thereafter, tube 47 is extracted, turret 41 indexes and cylinder PC either falls from pocket 46 or is pushed by plunger 48 on the next succeeding recoring operation. The indexing period of all the indexing movements of the machine is 150° of the timing cycle with a dwell of 210°. This allows ample time for the intervening functions to be performed and still allow the machine to have a substantial throughput.

From the foregoing, it will be seen that a machine has been disclosed enabling commercial practice of the methods and means disclosed in my prior patents and which is particularly suited for large scale operation such as in a cannery by processing pineapples with a minimum of hand labor and a maximum production of commercially saleable product at an increased value.

I claim:

1. In a pineapple peeler, means for positioning a pineapple with its core axis extending in a predetermined direction, pineapple moving means adjacent the positioning means to engage and move the pineapple along a path in alignment with said direction, pineapple coring means in a position to receive the pineapple and to cut a hole axially and centrally through the core of the pineapple, yielding means adjacent the coring means to engage the pineapple while it is being cored and yieldably resisting movement of the pineapple in said direction, and disengaging means to disengage the pineapple moving means from the pineapple whereupon said yielding means moves the pineapple relative to said coring means in a direction opposite to said direction, thus spacing an end of the pineapple from the coring means to enable cutting of said end from the pineapple.

2. In a pineapple peeler as in claim 1 wherein means are provided limiting said opposite movement of the pineapple to a determined position.

3. In a pineapple peeler as in claim 2 wherein means are provided to retain the pineapple at the predetermined position with the pineapple end projecting beyond said coring means.

4. In a pineapple peeler, means for positioning a pineapple with its core axis extending in a predetermined direction, the pineapple being impaled centrally of its core upon an elongate, hollow, tubular core hole cutting means at a first indexed position; pineapple moving means adjacent the positioning means to engage and move the pineapple along a path in alignment with said predetermined direction, means for engaging the pineapple and retaining the pineapple at a predetermined, stationary position on the core hole cutting means; said pineapple core hole cutting means being in a position to receive the pineapple and to cut a hole axially and centrally through the core of the pineapple, yielding means adjacent the core hole cutting means to engage the pineapple while it is being cored and to yieldably resist movement of the pineapple in said predetermined direction, and disengaging means to disengage the pineapple moving means from the pineapple whereupon said yielding means moves the pineapple relative to said core hole cutting means in a direction opposite to said predetermined direction, thus spacing an end of the pineapple from the core hole cutting means to enable cutting of said end from the pineapple indexing means for moving the pineapple, said core hole cutting means and said retaining means from said first indexed position to a second indexed position while said pineapple is retained at its predetermined position on the core hole cutting means; knife means in the path of movement of the pineapple from its first indexed position to the second indexed position for cutting at least one end from the pineapple; and core ejecting means at said second indexed position to eject the core from within said core hole cutting means.

5. In a pineapple peeler as in claim 4 including a spindle, means to move the pineapple to a further position wherein the axis of the core hole is in line with the spindle, means to engage and transfer the pineapple to said spindle with the free end of the pineapple projecting beyond said spindle, and means to release the position retaining means prior to transfer of the pineapple to said spindle.

6. In a pineapple peeler as in claim 4 wherein means are provided to return the core hole cutting means to a position for cutting of another core in another pineapple.

7. In a pineapple peeler as in claim 4 wherein multiple pineapple moving means, multiple core hole cutting means, and multiple position retaining means are arranged for seriation passage through the said sequence.

8. In a pineapple peeler, a rotatable turret movable in steps through a series of stations, a plurality of hollow core drills carried by and extending vertically and equally spaced about the turret, a centering head for engaging and centering a pineapple axially of its core for delivery of the pineapple at a first station of the turret, indexing means for aligning a core drill mounted on the turret with the centering head whereby the pineapple is delivered from the centering head onto the core drill to cut a core hole axially of the core in the pineapple, a second station for the turret having core ejection means for ejecting the core cut by the core drill, a finned peeling spindle at another station and arranged to be axially aligned with the core drill, and transfer means at said another station for the turret at which a cored pineapple is engaged by the transfer means and transferred from the core drill and delivered to the finned peeling spindle for engaging the core hole cut in the pineapple.

9. In a pineapple peeler as in claim 8 wherein means engage the pineapple following initial cutting of the core hole to move the pineapple past the end of the core drill to ensure completion of cutting of the core.

10. In a pineapple peeler as in claim 8 wherein a knife is positioned such that following completion of the cutting and ejection of the core the knife cuts off the top of the pineapple.

11. In a pineapple peeler as in claim 8, wherein positioning means is associated with the core drills for positioning the pineapples on the core drills, said positioning means including a spring supporting platform, a pusher finger movable into engagement with a pineapple on the platform to move the pineapple and the platform against the resistance of the spring supporting the platform to a predetermined position whereat the pineapple and the platform are held, and a holding means engaging the pineapple to retain the pineapple at a prefixed height upon withdrawal of the pusher finger.

12. In a pineapple peeler as in claim 11 wherein prior to withdrawal of the pusher finger a second finger moves in to fix the elevation of the pineapple.

13. In a pineapple peeler as in claim 11, further including a second pusher finger and means mounting said second finger above the pineapple when said pusher is withdrawn, said second finger being moved against the pineapple prior to withdrawal of the pusher finger.

14. A machine for processing pineapples comprising means for positioning a pineapple with its core axis extending in a predetermined direction, pineapple centering means for centering the pineapple about its core axis, pineapple moving means adjacent the positioning means to engage and move the pineapple along a path in alignment with said predetermined direction, core hole cutting means positionable in alignment with the core axis for centering the pineapple and drilling a core hole along the core axis centrally of the pineapple and of a smaller diameter than the core of the pineapple, said pineapple core hole cutting means being in a position to receive the pineapple and to cut a hole axially and centrally through the core of the pineapple, yielding means adjacent the core hole cutting means to engage the pineapple while it is being cored and to yieldably resist movement of the pineapple in said predetermined direction, and disengaging means to disengage the pineapple moving means from the pineapple whereupon said yielding means moves the pineapple relative to said core hole cutting means in a direction opposite to said predetermined direction, thus spacing an end of the pineapple from the core hole cutting means to enable cutting of said end from the pineapple, a peeling spindle axially alignable with the core hole cutting means, transfer means engageable with the pineapple for transferring the pineapple onto the peeling spindle by utilizing the core hole in the pineapple to receive the spindle, first and second cutter means engageable with the pineapple while it is retained on the peeling spindle for peeling first and second layers, respectively, from the outer surface of the pineapple, and means for removing the peeled pineapple from the peeling spindle.

15. A machine as defined in claim 14, including means for forming the peeled pineapple into (1) a cylindrically shaped inner portion and (2) an outer blanket of the portion of the pineapple surrounding the inner portion.

16. A machine as defined in claim 14, including means for removing the remaining fibrous core of the pineapple subsequent to removal of the peeled pineapple from the peeling spindle.

17. A machine as defined in claim 14, including an indexable turret supporting multiple peeling spindles equidistantly spaced about the turret and movable through a series of stations including an infeed station whereat each peeling spindle is sequentially aligned with said core hole drill means, a first peeling station adjacent said first cutter means, a second peeling station adjacent said second cutter means, and an outfeed station wherein said peeled pineapple is removed from said peeling spindle.

18. A machine as defined in claim 17, including spindle drive means for rotating said peeling spindles at each of said peeling stations.

19. A machine as defined in claim 18, including one revolution means coupled to said spindle drive means and responsive to the turret advancing the peeling spindles into each of the peeling stations to revolve the spindle at least one full revolution at each peeling station.

20. A machine as defined in claim 19 wherein said indexable turret and said means for transferring the pineapple onto and off of said peeling spindles have an integrated drive system such that pineapples are sequentially transferred onto the spindles, then peeled to remove a layer and then transferred off of the spindles.

21. A machine for processing pineapples, comprising: a first turret having multiple pineapple supporting spindles equidistantly spaced about the turret; means adjacent the first turret for placing a pineapple on at least a first of said spindles, with an end of the pineapple projecting beyond the end of the spindle; means adjacent said first turret for removing the end of the pineapple projecting beyond said first spindle; a second turret having multiple pineapple supporting spindles equidistantly spaced about the second turret and having one of its spindles in alignment with one of the spindles of said first turret; transfer means for moving a pineapple supported on a spindle of said first turret to a spindle of said second turret with the other end of the pineapple projecting beyond the end of the spindle of the second turret; and means adjacent said second turret for removing the other end of the pineapple projecting beyond the spindle of the second turret.

22. A machine as defined in claim 21 wherein said second turret spindles have fins projecting radially therefrom for engaging the pineapple in said central hole.

23. A machine as defined in claim 22 and having cutters adjacent said second turret engaging the outer surface of said pineapple for peeling the skin therefrom, and means for rotating said second turret spindles at said cutters to remove a circumferential band of skin from said pineapple.

24. A machine as defined in claim 23 wherein said cutters include a first cutter array with the cutters thereof in spaced array which remove spaced first bands from said pineapple, and a second array of spaced cutters for removing the unpeeled bands between the first bands, and means for moving said turret to bring the spindles sequentially adjacent the first and second cutter arrays.

25. A machine as in claim 24 wherein said means for rotating said second turret spindles includes means for accelerating and decelerating said rotation so that a pineapple on a spindle is subjected to a minimal torque force at all times.

26. A machine for processing pineapples, comprising: positioning means for aligning a pineapple about its core axis with the core axis extending in a predetermined direction; pineapple moving means including a first processing turret having indexing means associated therewith; a plurality of first spindles equidistantly spaced on said first turret with one of said first spindles aligned with said positioning means at each index; conveyor means for moving said centered pineapple from the positioning means onto said first spindle for cutting a central hole through the core of said pineapple; a core hole cutting means, said pineapple core hole cutting means being in a position to receive the pineapple and to cut a hole axially and centrally through the core of the pineapple, yielding means adjacent the core hole cutting means to engage the pineapple while it is being cored and to yieldably resist movement of the pineapple in said predetermined direction, and disengaging means to disengage the pineapple moving means from the pineapple whereupon said yielding means moves the pineapple relative to said core hole cutting means in a direction opposite to said predetermined direction, thus spacing an end of the pineapple from the core hole cutting means to enable cutting of said end from the pineapple and first knife means adjacent said first turret and positioned to sever said moving projecting pineapple end as said turret is indexed.

27. A machine as defined in claim 26 wherein said first spindles are hollow and have core cutting ends engaging said centered pineapple and rotatably mounted on said first turret to drill a hole centrally of an aligned pineapple.

28. A machine as defined in claim 26 wherein said locator means includes spring supported means for urging said drilled pineapple toward said end of the spindle.

29. A machine as defined in claim 26 wherein said first spindles have an axial bore for receiving the central core of the drilled pineapple, and core ejector means for removing the pineapple core material from each of said first spindles.

30. A machine as defined in claim 26 and having a second processing turret having indexing means associated therewith, a plurality of second spindles equidistantly spaced on said second turret with one of said second spindles aligned with one of said first spindles at each index position, and transfer means for transferring a pineapple from a first spindle onto an aligned second spindle.

31. A machine as defined in claim 30 wherein said transfer means positions a pineapple on said second spindle with the other end thereof projecting a predetermined distance from the end of said second spindle, and second knife means carried adjacent said second turret and positioned to sever the projecting end of said pineapple when said second turret is indexed.

32. A machine as defined in claim 31 and having first cutter means positioned adjacent said second turret for peeling a first layer from the outer surface of the pineapple, and second cutter means positioned adjacent said second turret for peeling another layer from the pineapple.

33. A machine as defined in claim 32 and having separate means for collecting the cuttings from each of the first and the second cutter means.

34. A machine as defined in claim 32 and including spindle drive means for rotating said spindles at said cutter means.

35. A machine as defined in claim 32 wherein said first and second cutter means each includes a pair of cutter arrays spaced to remove spaced circumferential bands from the outer surface of the pineapple while maintaining the ovoid profile of the pineapple.

36. A machine as defined in claim 32 and having second transfer means for transferring the pineapple from said second spindle.

37. A machine as defined in claim 32 and having circular knife means in alignment with said second transfer means and adapted to form said transferred pineapple into a cylindrically shaped inner portion.

38. A machine as defined in claim 32 and having slitting knife means positioned anterior of said circular knife means and helix means adapted to form the severed portion of the pineapple surrounding said inner cylindrical portion into a flat blanket.

39. A machine as defined in claim 37, including pocket means for receiving the cylindrically cut transferred pineapple and supporting the transferred pineapple with the core axis held centrally thereof, coring means for removing the remaining fibrous core material from the pineapple in said pocket means and means to eject the recored cylinder from the pocket means.

* * * * *